US008893205B2

(12) United States Patent
Lee et al.

(10) Patent No.: US 8,893,205 B2
(45) Date of Patent: Nov. 18, 2014

(54) IPTV RECEIVER AND METHOD OF PROVIDING CHANNEL MAP MANAGEMENT INFORMATION

(75) Inventors: Joon Hui Lee, Seoul (KR); Jae Hyung Song, Seoul (KR); Gomer Thomas, Piscataway, NJ (US)

(73) Assignee: LG Electronics Inc., Seoul (KR)

( * ) Notice: Subject to any disclaimer, the term of this patent is extended or adjusted under 35 U.S.C. 154(b) by 1201 days.

(21) Appl. No.: 12/314,267

(22) Filed: Dec. 5, 2008

(65) Prior Publication Data

US 2009/0158349 A1 Jun. 18, 2009

Related U.S. Application Data

(60) Provisional application No. 60/992,676, filed on Dec. 5, 2007, provisional application No. 61/030,571, filed on Feb. 22, 2008.

(30) Foreign Application Priority Data

Dec. 5, 2008 (KR) .................. 10-2008-0123419

(51) Int. Cl.
| | | |
|---|---|---|
| H04N 7/173 | (2011.01) | |
| H04N 21/482 | (2011.01) | |
| H04N 21/2362 | (2011.01) | |
| H04N 21/434 | (2011.01) | |
| H04N 21/643 | (2011.01) | |
| H04N 21/438 | (2011.01) | |

(52) U.S. Cl.
CPC ......... *H04N 21/2362* (2013.01); *H04N 21/482* (2013.01); *H04N 21/4345* (2013.01); *H04N 7/17318* (2013.01); *H04N 21/64322* (2013.01); *H04N 21/4383* (2013.01)
USPC .......................................... 725/115; 725/105

(58) Field of Classification Search
None
See application file for complete search history.

(56) References Cited

U.S. PATENT DOCUMENTS

| 5,951,639 A | 9/1999 | Macinnis |
| 6,763,522 B1 | 7/2004 | Kondo et al. |

(Continued)

FOREIGN PATENT DOCUMENTS

| EP | 1 657 837 | 5/2006 |
| EP | 1 732 252 | 12/2006 |

(Continued)

OTHER PUBLICATIONS

Advanced Television Systems Committee, Program and System Information Protocol for Terrestrial Broadcast and Cable (Revision A) and Amendments No. 1 and 3 (Dec. 23, 1997; Rev. A—May 31, 2000), http://www.w6rz.net/a_65cr1_with amend_1.pdf.

(Continued)

*Primary Examiner* — Mark D Featherstone
(74) *Attorney, Agent, or Firm* — McKenna Long & Aldridge LLP

(57) ABSTRACT

AN IPTV receiver and a method of providing channel map management information are provided. A network interface transmits and receives an IP packet through a network. An IP network stack checks a destination of the received IP packet and classifies the IP packet according to a protocol. A Service Information (SI) decoder parses a system information (SI) decoder parsing a provision information record included in the IP packet to read location information of a master SI table included in the provision information record, and parses a master SI table record included in the IP packet to read channel map management information included in the master SI table record. An IPTV terminal function (ITF) operation controller controls the reception of the master SI table record based on the read location information of the master SI table.

15 Claims, 22 Drawing Sheets

(56) References Cited

U.S. PATENT DOCUMENTS

| | | | |
|---|---|---|---|
| 7,032,236 | B1 | 4/2006 | Ozkan et al. |
| 7,096,484 | B2 | 8/2006 | Mao et al. |
| 7,150,029 | B1 * | 12/2006 | Ebling et al. .................. 725/39 |
| 7,930,726 | B2 | 4/2011 | Sim et al. |
| 2001/0010097 | A1 | 7/2001 | Lee |
| 2001/0049720 | A1 | 12/2001 | Ever |
| 2003/0154492 | A1 | 8/2003 | Falvo et al. |
| 2004/0022278 | A1 | 2/2004 | Thomas et al. |
| 2004/0225846 | A1 | 11/2004 | Guo |
| 2004/0268412 | A1 | 12/2004 | Kim |
| 2005/0097543 | A1 | 5/2005 | Hirayama |
| 2005/0283799 | A1 | 12/2005 | Domegan et al. |
| 2006/0037060 | A1 | 2/2006 | Simms et al. |
| 2006/0279659 | A1 | 12/2006 | Yun et al. |
| 2007/0033610 | A1 | 2/2007 | Sohn et al. |
| 2007/0050820 | A1 | 3/2007 | Saarikivi et al. |
| 2007/0150926 | A1 | 6/2007 | Zuo |
| 2007/0180462 | A1 | 8/2007 | Shin et al. |
| 2008/0127255 | A1 | 5/2008 | Ress et al. |
| 2008/0307108 | A1 | 12/2008 | Yan et al. |
| 2009/0055877 | A1 | 2/2009 | Rhim |
| 2009/0133074 | A1 | 5/2009 | White et al. |
| 2009/0138923 | A1 | 5/2009 | Kim et al. |
| 2009/0158327 | A1 | 6/2009 | Song et al. |
| 2009/0158349 | A1 | 6/2009 | Song et al. |
| 2009/0183206 | A1 | 7/2009 | Lee et al. |
| 2009/0204986 | A1 | 8/2009 | Lee et al. |
| 2009/0235317 | A1 | 9/2009 | Igarashi |

FOREIGN PATENT DOCUMENTS

| | | |
|---|---|---|
| EP | 2 001 203 | 12/2008 |
| JP | 2005-135187 | 5/2005 |
| KR | 10-2001-0073903 | 8/2001 |
| KR | 10-2006-0053059 | 5/2006 |
| KR | 2006-0102706 | 9/2006 |
| KR | 10-2007-0030739 | 3/2007 |
| KR | 10-2007-0032522 | 3/2007 |
| KR | 2007-0032103 | 3/2007 |
| KR | 2007-0059851 | 6/2007 |
| KR | 2007-0088192 | 8/2007 |
| WO | 0105157 A2 | 1/2001 |
| WO | WO 01/05158 | 1/2001 |
| WO | WO 2007/096001 | 8/2007 |

OTHER PUBLICATIONS

ATSC Standard: Program and System Information Protocol for Terrestrial Broadcast and Cable (Revision B), Mar. 2003, Advanced Television Systems Committee, p. 1-157.

"Digital Video broadcasting (DVB); Transport of MPEG-2 based DVB services over IP Based networks", ETSI TS 102 034, V1.1.1., Mar. 2005.

"Digital Video broadcasting (DVB); IP datacast over DVB-H: Electronics Service Guide (ESG)", ETSI TS 102 471, V1.2.1., Nov. 2006.

"Digital Video broadcasting (DVB); IPDC over DVB-H: Electronic Service Guide (ESG) implementation guidelines", ETSI TS 102 592, V1.1.1., Oct. 2007.

\* cited by examiner

IPTV RECEIVER AND METHOD OF PROVIDING CHANNEL MAP MANAGEMENT INFORMATION

This application claims the benefit of U.S. Provisional Application No. 60/992,676, filed on Dec. 5, 2007, U.S. Provisional Application No. 61/030,571, filed on Feb. 22, 2008, and Korea Application No. 10-2008-0123419, filed on Dec. 5, 2008, is all of which are hereby incorporated by reference as if fully set forth herein.

BACKGROUND OF THE INVENTION

1. Field of the Invention

The present invention relates to an IPTV receiver and a method of providing channel map management information, and more particularly, to an IPTV receiver and a method of providing channel map management information using an Internet protocol.

2. Discussion of the Related Art

Conventional TV services are provided such that a cable, terrestrial, or satellite broadcast provider transmits content created by a broadcaster through a radio communication medium such as a broadcast network and users view the broadcast content using a TV receiver that can receive signals of the communication medium.

As digital TV technologies have been developed and commercialized, it has become possible to provide a variety of content such as real-time broadcasts, Content on Demand (CoD), games, and news to viewers not only using the existing radio medium but also using the Internet connected to each residence.

One example of provision of content using the Internet is an Internet Protocol TV (IPTV) service. The IPTV service provides an information service, moving image content, broadcasts, etc., to a television using high-speed Internet.

While the IPTV service is similar to general cable broadcasting or satellite broadcasting in that it provides broadcast content such as video content, the IPTV service is characterized in that it also supports bidirectional communication. The IPTV service also allows users to view a desired program at a desired time, unlike general terrestrial broadcasting, cable broadcasting, or satellite broadcasting.

SUMMARY OF THE INVENTION

Accordingly, the present invention is directed to an IPTV receiver and a method of providing channel map management information that substantially obviate one or more problems due to limitations and disadvantages of the related art.

An object of the present invention is to provide an IPTV receiver and a method of providing channel map management information which can efficiently search for and obtain an IPTV service.

Another object of the present invention is to provide an IPTV receiver and a method of providing channel map management information which can efficiently manage information of IPTV services.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of providing channel map management information for providing a channel map in an Internet protocol TV (IPTV) transmitter includes transmitting a provision information record including location information of a master system information (SI) table through a network, and transmitting a master SI table record pointed by the location information of a master system information (SI) table, wherein the master SI table record includes channel map management information. Herein, the provision information record includes at least one of the location information of the master SI table, electronic programming guide (EPG) discovery information and address information of a remote configuration and management (RCM) server.

Also, the channel map management information includes at least one of identifier information of a service provider, version information of the master SI table record, location information of a channel map record, and version information of a channel map record.

Also, the channel map management information includes one or more pointers for pointing one or more channel map records.

Also, the method further includes receiving a request of the master SI table record transmitted based on the location information of the master SI table.

In another aspect of the present invention, a method of providing a channel map management information for building a channel map in an Internet protocol TV (IPTV) receiver includes connecting a service provider through a network; receiving a provision information record, parsing the received provision information record and reading location information of a master system information (SI) table included in the provision information record, receiving the master SI table record based on the read location information of the master SI table, and parsing the received master SI table record and reading channel map management information included in the master SI table record. Herein, further comprising: requesting the master SI table record based on the location information of the master SI table.

Also, the provision information record includes at least one of the location information of the master SI table, electronic programming guide (EPG) discovery information and address information of a remote configuration and management (RCM) server.

Also, the channel map management information includes at least one of identifier information of a service provider, version information of the master SI table record, location information of a channel map record, and version information of a channel map record.

Also the channel map management information includes one or more pointers for pointing one or more channel map records.

In another aspect of the present invention, an Internet protocol TV (IPTV) receiver includes a network interface transmitting and receiving an Internet protocol (IP) packet through a network, an IP network stack confirming a destination of the received IP packet and dividing the IP packet according to protocols, a system information (SI) decoder parsing a provision information record included in the IP packet, reading location information of a master SI table included in the provision information record, parsing a master SI table record included in the IP packet, and reading channel map management information included in the master SI table record, and an IPTV terminal function (ITF) operation controller controlling the reception of the master SI table record based on the read location information of the master SI table. Herein, the ITF operation controller controls the master SI table record to be requested based on the location information of the master SI table.

Also, the provision information record includes at least one of the location information of the master SI table, electronic programming guide (EPG) discovery information and address information of a remote configuration and management (RCM) server.

Also, the channel map management information includes at least one of identifier information of a service provider, version information of the master SI table record, location information of a channel map record, and version information of a channel map record.

Also, the channel map management information includes one or more pointers for pointing one or more channel map records.

The IPTV receiver and the method of providing channel map management information according to the present invention have advantages in that it is possible to efficiently search for and obtain an IPTV service and to quickly and correctly update IPTV service information, thereby enabling efficient management of IPTV service information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
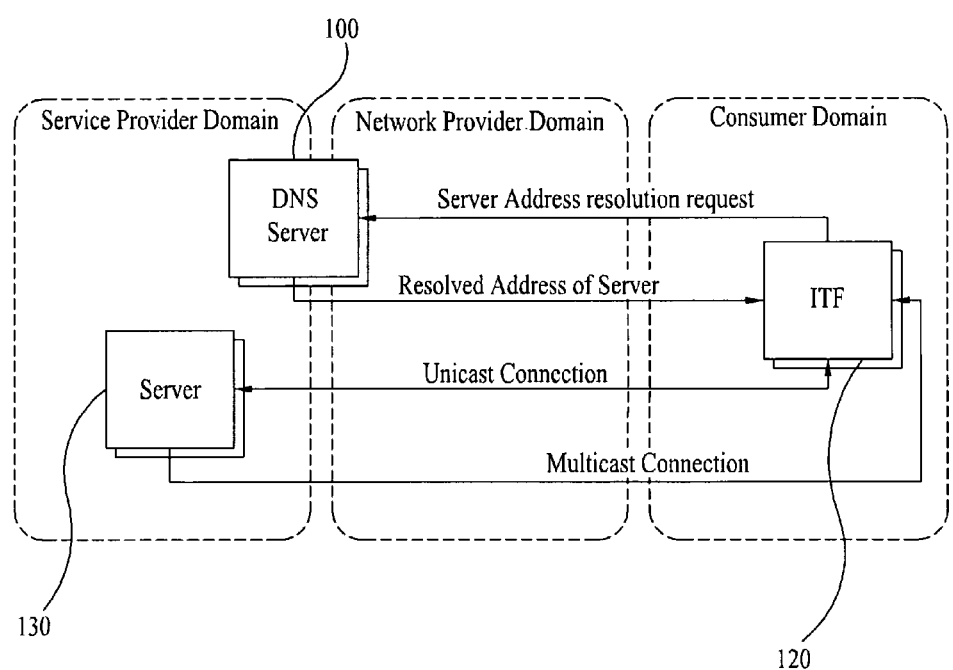
FIG. 1 illustrates a configuration of an IPTV system for providing IPTV services.

Preferred embodiments of the invention, which can achieve the above objects, will now be described with reference to the accompanying drawings. The configuration and operation of the invention, illustrated in the drawings and described below with reference to the drawings, will be described using at least one embodiment without limiting the spirit and the essential configuration and operation of the invention.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

FIG. 1 illustrates a configuration of an IPTV system for providing IPTV services.

As shown in FIG. 1, the IPTV system includes a service provider domain, a network provider domain, and a customer domain.

The service provider domain may include a content provider and a service provider. The content provider serves to provide content to the service provider. The service provider serves to provide services to subscribers, and collects a variety of content and converts content signals according to an IP environment and transfers the converted signals to users (or customers). The service provider also transmits multimedia data and performs maintenance, repair, and management of a transmission network to enable users to reliably receive content and provides functions and facilities to enable the content provider to transmit data over the network. Here, the service provider may be a virtual entity and the content provider may also serve as the service provider.

The network provider domain serves to connect users and the service provider through an IP network. The transmission system may use a variety of networks such as an access network, a backbone network, or a wireless Wide Area Network (WAN).

The customer domain is a domain which consumes IPTV services. The customer domain serves to reproduce data received using facilities such as xDSL or cable or to immediately reply to a request made by a user. The customer domain mostly includes companies which produce IPTV-related devices, the types of which can be divided into IPTVs, IP STBs, IP phones, etc. In the customer domain, a customer domain apparatus may be used to receive and display a broadcast containing content provided by the content provider. Examples of the customer domain apparatus include a set-top box, a PC, a mobile terminal, an IPTV Terminal Function (ITF) device, or a Delivery Network Gateway (DNG) device.

The following is a more detailed description of each of the domains.

The content provider may be a TV station or a radio station that produces broadcast programs. The TV station is a conventional terrestrial or cable broadcast station. The broadcast station produces and stores programs that can be viewed by users and can convert the programs to digital signals for transmission. The purpose of converting programs into digital signals is to enable transmission of various types of broadcasts.

The radio station is a general radio broadcast station and is operated without video channels in most cases although it may provide video channels in some cases. Video on Demand (VoD) and Audio on Demand (AoD) services have different characteristics from those of the TV station or the radio station. The content provider generally provides live broadcast programs such that users cannot rewind or pause and view the programs unless they record the programs. However, in the case of VoD or AoD services, the service provider stores broadcast programs or movies or music and then provides them to users such that the users can reproduce and view desired broadcast programs or movies or music when they desire to view. For example, when a customer cannot view a broadcast program due to lack of time, they can, at a later time, access a site that provides such a broadcast service and download or immediately reproduce a corresponding file. Similarly, when a customer cannot listen to an audio program due to lack of time, they can, at a later time, access a site that provides such an audio service and download or immediately reproduce a corresponding file. Music on Demand (MoD) services allow customers to download and listen to desired music. Music companies or distributors can provide such MoD services by extending existing web services.

Reference will now be made to embodiments of services provided by the content provider.

A PF service can be provided by a company that manages all broadcast information and location information provided by the content provider. This service mainly, contains broadcast time information of a corresponding broadcast station or location information required for broadcasting and information which enables users (or customers) to access the broadcast station. Customers can obtain and display such information on the screen. The PF service should be provided by each broadcast station. In IPTV environments, the PF service is provided to allow customers to access the corresponding broadcast station.

The EPG service is a convenient service that allows customers to check broadcast programs for each time zone and for each channel. A program that provides the EPG service is previously installed automatically on a customer device so that it is executed when requested. While the customer can obtain some information of the corresponding broadcast station from the PF service, they can use the EPG service more conveniently since they can collectively obtain information of real-time broadcast channels of all broadcast stations using the EPG service. For example, since the IPTV has useful functions, for example a function to schedule recording of a program such as CNN news and a function to schedule viewing of a broadcast such as a Disney broadcast, the EPG service should provide detailed information of broadcast programs of a corresponding region for each time zone. Certain drama-related EPG is designed to allow search of the contents of the drama and to allow classification of programs into categories such as science fiction, drama, and animation. The EPG may also contain detailed information of story or characters of a drama or movie of a simple broadcast program. One major challenge of the EPG service is how to transmit EPG data suitable for the customer since there are a lot of types of customer licenses for IPTV viewing. To access the EPG service, the customer only needs to locate and press an input key on a remote controller.

An Electronic Content Guide (ECG) service provides a variety of functions that allow the customer to easily use information regarding a variety of content provided by the content provider, the location of a corresponding access server, the authority to access the server, etc. That is, the ECG service has a function to allow the customer to easily access servers that store a variety of content and serves as an EPG that provides detailed information of the content. The ECG provides integrated information of services such as AoD, MoD, and VoD rather than real-time broadcasts, similar to the EPG to reduce the burden of the customer having to individually access a content service to view or download content. Although the ECG service is similar to the EPG service, the ECG does not provide real-time broadcast channel information but instead allows the customer to view, download, and store content at any time since the content is stored in the server. To access a server that contains each desired content item, the customer needs to enter an address, which it is very difficult to type, and to access PF servers. This is a very complicated procedure requiring a lot of time. A company that provides the ECG allows the ECG program to be automatically installed on the customer device and collects information of all content items and provides corresponding data. Similar to the EPG service, to access the ECG service, the customer only needs to click a corresponding input key on the remote controller.

A portal service is a web service provided by each broadcast station and a portal server that provides such a portal service is connected to a web server of a company that provides content services. The portal service allows the customer to search or view a list of programs provided by each broadcast station or by content providers that provide content services. The functions of the portal service are similar to those of the ECG or EPG. However, since the portal service also provides functions associated with user authentication or license contract, it is necessary for the customer to access the portal service to view a desired program. While the ECG or EPG service provides an integrated broadcast or content list, the portal service provides information of a list of content or broadcasts provided by a corresponding program provider, thereby enabling detailed search. To access the portal service, the customer only needs to click a portal input key on the remote controller.

Equipment of the content provider needs to have functions to provide such services. To allow these functions to operate normally, a server 130 of each service company should already be connected to the IP network so that it can transmit a corresponding program in real time or transmit broadcast information. Each broadcast station or service company should be equipped with a system that is connected to the network of the service provider to enable transmission of multimedia data without errors or delay using a real-time Internet protocol such as RTP, RTSP, RSVP, or MPLS. For example, to transmit the multimedia data created according to the MPEG-2 and AC-3 audio specification from a TV studio that currently provides news data, the corresponding server needs to transcode the multimedia data into an IPTV format. After this process, an RTP/UDP protocol including time information is attached to the multimedia data to implement a caption or overdub feature and the multimedia data is then transmitted through the IP network provided by the service provider.

The service provider provides the bandwidth and the stability of the network to allow satisfactory transmission of multimedia data and/or broadcast data received from the content provider. Service providers may provide IPTV services using the existing cable network. In this case, it is necessary to change equipment of the delivery network. That is, it is necessary to construct equipment that can perform real-time data transmission and to construct a network for the customer in consideration of the bandwidth. Such equipment should use a multicast service, which is a basic network service of the IPTV, to process a large amount of multimedia data in order to reduce the bandwidth. When the bandwidth is not secured, the service provider may re-transcode multimedia broadcast data received from the content provider or the optical cable network and reconstruct the data into an MPEG-4 or MPEG-7 format for transmission. To accomplish this, the service provider should provide some services which mainly include a Network Management System (NMS) service, a Dynamic Host Control Protocol (DHCP) service, and a CDN service.

The NMS service provides a function to manage the delivery network over which the service provider can transmit data to each customer (or user) and a Remote Configuration and Management Server (RCMS) function. That is, when the customer cannot receive a broadcast since a problem has occurred in the transmission network, the service provider should have means for immediately solving the problem. The NMS is widely used as a standardized means for smoothly controlling and managing remote transport layer machines. Using this service, it is possible to determine how much traffic has occurred for a broadcast and an area where the bandwidth is insufficient. Also, the service provider should provide content providers with the NMS service to allow the content providers to generate and manage multicast groups when providing a multicast service. This is because the service provider may need to be able to further generate a multicast group in some cases.

The DHCP service is used to automatically allocate an IP address to the IPTV receiver of the customer and to inform the IPTV receiver of the address of the CDN server. The DHCP service is also used as an appropriate means for allocating an IP address to a PC in a general network. That is, it is necessary to transmit an available address to an IPTV receiver that is authorized to use the server to allow the customer to perform a registration procedure when initially accessing the server. Generally, an IPTV receiver which supports IPv4 also supports IPv6. Thus, an IPTV receiver which supports IPv4 can also be used.

The CDN service is provided as data that the service provider provides to the IPTV receiver. When the IPTV receiver is powered on to start operation, the IPTV receiver receives CDN information from the service provider while receiving IP information through the DHCP service. The CDN information contains information associated with user registration or authentication performed by the IPTV service provider and PF information described above. By acquiring the CDN information from the service provider, the IPTV receiver can receive an IP broadcast signal.

The customer may have various types of IPTV receivers. If the customer has a general TV receiver, the customer may rent an IPTV STB to enjoy an IPTV broadcasting service at a low cost. The customer may also apply for an IP phone at a low service cost while the service provider pays the additional service fee. The IPTV receiver basically includes a network interface that can access the network and an Internet protocol to receive and process data packets received from the network. When the data is multimedia data, the IPTV receiver reproduces the data on the screen. Here, when the customer has issued a request by operating the remote controller, the IPTV receiver immediately transmits a corresponding data packet to the server through the network to receive corresponding information from the server. That is, the IPTV receiver can operate to transmit a request from the customer to the server while processing received multimedia data in a bidirectional fashion. A variety of IPTV buttons may also be provided on the IPTV receiver to allow the customer to fully use the service. Using the IPTV receiver, the customer can store and view key scenes in a drama and can receive additional services such as hotel reservation or location information services.

On the other hand, the NMS that has been described above provides not only the function to allow the service provider to manage the network but also an RCMS function. The RCMS function helps the customer to control and manage their IPTV receiver. The importance of the RCMS will increase as the use of IPTV receivers increases and the number of additional relevant services increases. Thus, the SNMP protocol has been compulsorily employed in IPTV broadcast receivers in order to allow the service provider to manage and control IPTV broadcast receivers. This will enable the IPTV broadcast receiver to acquire statistical data of a protocol currently used for communication and information of a currently used processor and to identify the TV manufacturer.

To receive an IPTV service, an ITF 120 in the customer domain can transmit a server address resolution request to a DNS server 110. The DNS server 110 then transmits a server address to the ITF 120. Using the received address, the ITF 120 connects to the server 130 to receive an IPTV service. Here, the ITF 120 can connect to the server 130 using at least one of a multicast scheme and a unicast scheme.

Figure 2:
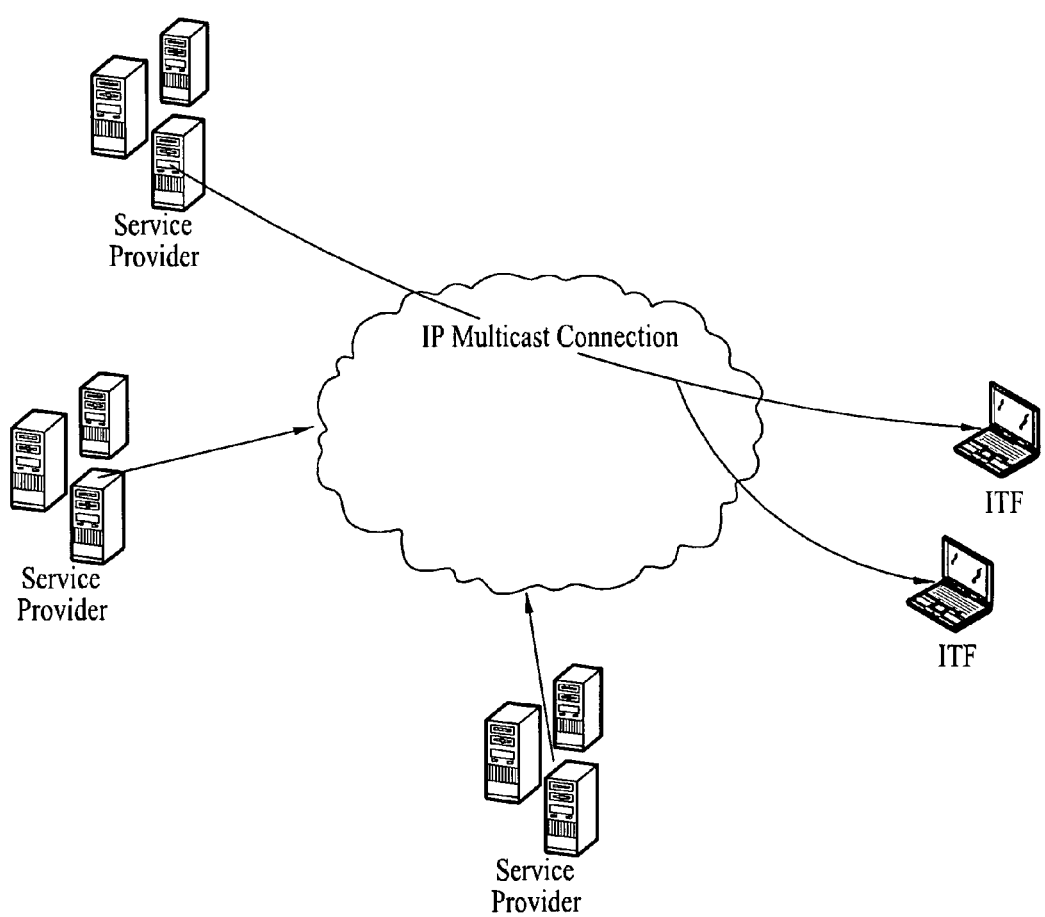
FIG. 2 schematically illustrates a multicast scheme.

FIG. 2 schematically illustrates the multicast scheme.

As shown in FIG. 2, the multicast scheme is a method in which data is transmitted to a number of receivers in a specific group. For example, the service provider can collectively transmit data to a number of registered ITFs. An Internet Group Management Protocol (IGMP) protocol can be used for the multicast registration.

Figure 3:
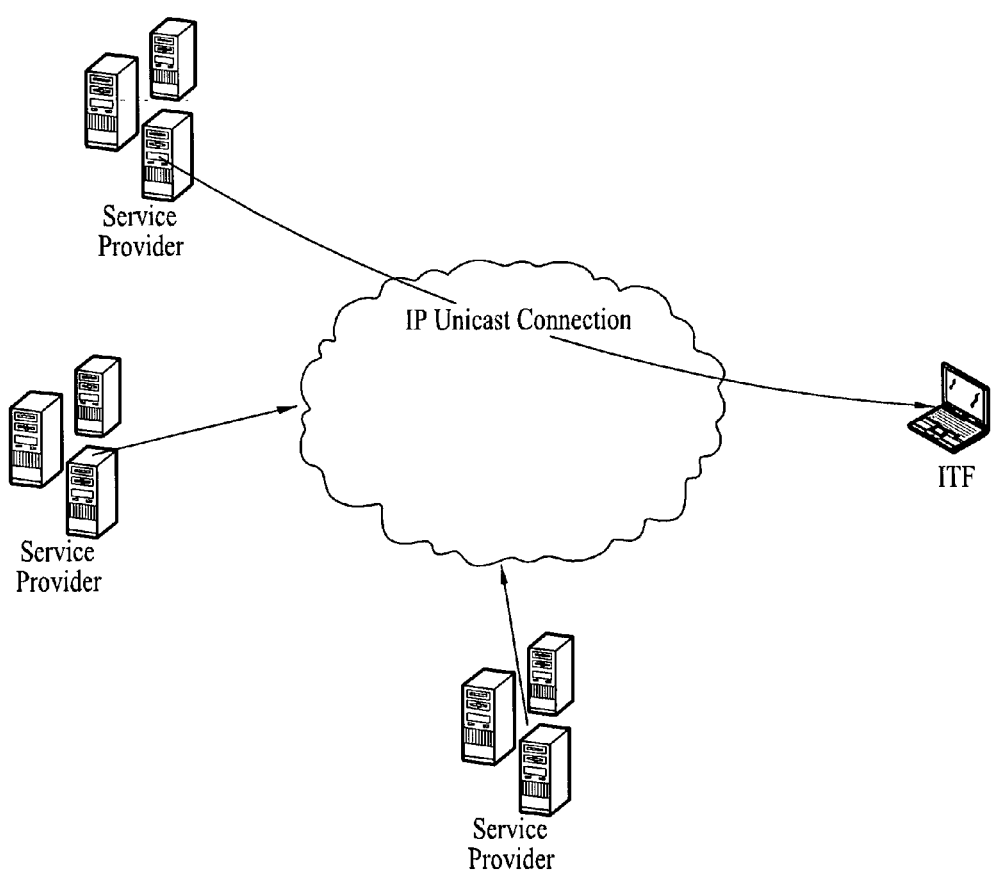
FIG. 3 schematically illustrates a unicast scheme.

FIG. 3 schematically illustrates the unicast scheme.

As shown in FIG. 3, the unicast scheme is a method in which one transmitter transmits data to one receiver in a one to one manner. For example, in the case of the unicast scheme, when an ITF has requested a service from the service provider, the service provider transmits a corresponding service to the ITF in response to the request.

Figure 4:
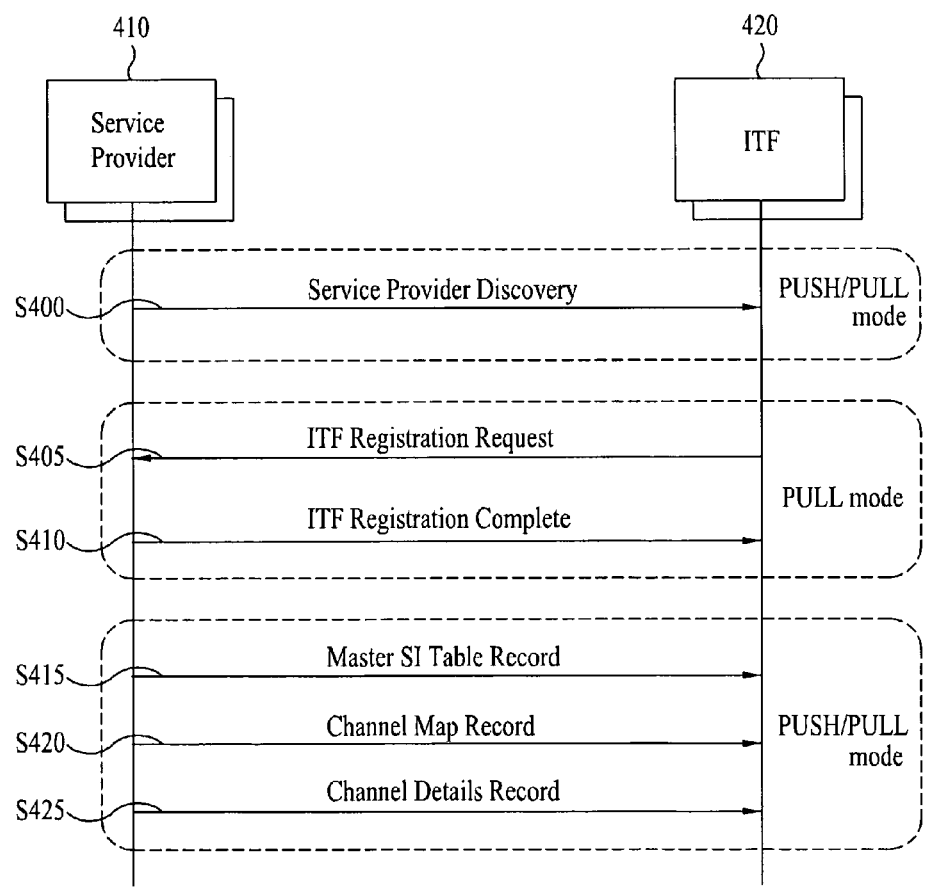
FIG. 4 illustrates a procedure of a preferred embodiment of a method for discovering an IPTV service according to the present invention.

FIG. 4 illustrates a procedure of a preferred embodiment of a method for discovering an IPTV service according to the present invention.

As shown in FIG. 4, in order to receive an IPTV service, an ITF performs service provider discovery to search for a Service Discovery (SD) server address list. Here, the service provider discovery is a procedure in which the ITF searches for information regarding an IPTV service provider and information required to access the service provider through a network that is under security management. The ITF can search for the SD server address list in the following manner.

Method for Searching for SD Server Address List

1. Use of preset address or manual setting: The ITF complies with an address preset in the ITF or the customer manually sets an address.

2. DHCP-based SP Discovery: The ITF uses a DHCP option to acquire an SD server address list.

3. DNS SRV-based SP Discovery: The ITF issues a query using a DNS SRV mechanism to acquire SD server address list.

The ITF 420 can search for a specific SD server using the SD server address list obtained through the above processes 1 to 3 and can receive a service provider discovery record from the specific SD server.

The service provider 410 transmits a service provider discovery record to the ITF 420 (S400). Here, the service provider discovery record includes information regarding useful IPTV service providers and information required to access the service provider through a network that is under security management. The service provider discovery record can be transmitted in a push mode or a pull mode. In the pull mode, the service provider 410 transmits the service provider discovery record when the ITF 420 has issued a request to transmit the service provider discovery record. However, in the push mode, the service provider 410 transmits the service provider discovery record regardless of whether or not the ITF 420 has issued a request to transmit the service provider discovery record.

The ITF 420 accesses a registration server specified by registration server address information included in the service provider discovery record and performs an ITF registration process (S405). Here, information transmitted from the ITF 420 to the service provider 410 may be carried in an ITFRegistrationInputType record format and may include subscriber identification information and subscriber location information. In addition, the ITF registration can be termed a "Service Provider (SP) attachment" and the term may be changed depending on the intention or convention of those skilled in the art or the introduction of new technology.

After authentication is successfully performed, the service provider 410 transmits a provision information record to the ITF 420 (S410). Herein, the provision information record is a record for providing the provisioning information and the authentication information that are obtained by an ITF during the process of Service Provider attachment. The provision information record has an ITFRegistrationOutputType record format and may contain information customized to a service joined based on information included in the ITFRegistrationInputType record. Here, the ITFRegistrationInputType record may include at least one of subscriber identification information and subscriber location information. Here, the subscriber location information may be an address where the ITF of the subscriber is located. When the ITFRegistrationInputType record includes only the subscriber identification information, the registration server can obtain previously stored subscriber location information and subscription status information based on the subscriber identification information.

For example, the provision information may be customized using the subscription status of the subscriber and the location of the ITF. The ITF 420 may provide its ID and location information through the ITFRegistrationInputType record and the registration server may specify a service joined by the ITF 420 based on the ID and location information. The registration server provides, in an ITFRegistrationOutputType format, an address from which it is possible to obtain service information that should be received by the ITF 420 based on the specified service.

The service information is divided into a master SI table record for managing the version of channel details and a channel map, a channel map record for providing a list of channels in a packet format, and a channel details record that contains details of each channel. The service information can be transmitted in a push mode or a pull mode.

The service provider 410 transmits a master SI table record to the ITF 420 (S415). Here, the ITF 420 may receive the corresponding master SI table record or may request the corresponding master SI table record from the service provider 410 based on location information of the master SI table included in the provision information record.

The service provider 410 transmits a channel map record to the ITF 420 (S420). Here, the ITF 420 may receive a corresponding channel map record or may request a corresponding channel map record from the service provider 410 based on channel map management information included in the master SI table record.

The service provider 410 transmits a channel details record to the ITF 420 (S425). Here, the ITF 420 may receive the corresponding channel map record or may request the corresponding channel map record from the service provider 410 based on virtual channel information included in the master SI table record or channel details location information included in the channel map record.

Figure 5:
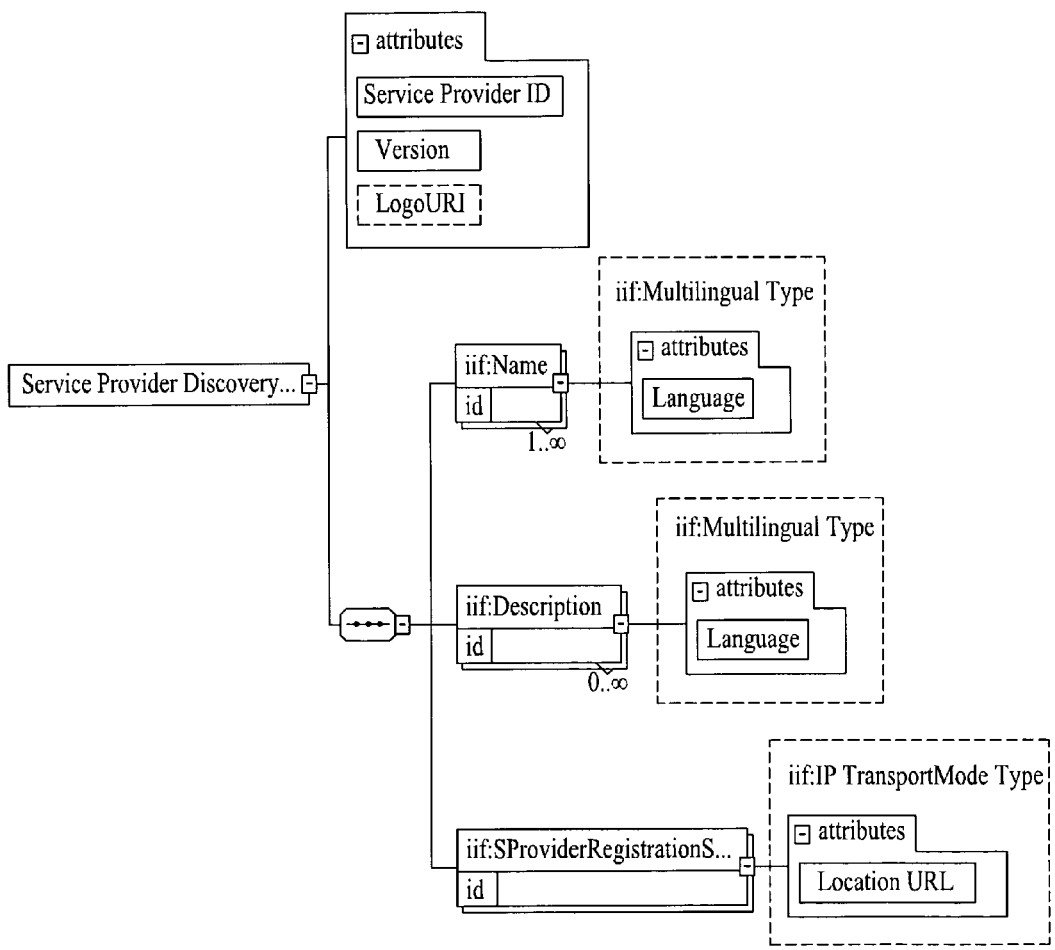
FIG. 5 illustrates a schema of a preferred embodiment of a service provider discovery type according to the present invention.

FIG. 5 illustrates a schema of a preferred embodiment of a service provider discovery type according to the present invention.

As shown in FIG. 5, the service provider discovery record includes a ServiceProviderID attribute, a Version attribute, a LogoURI attribute, a Name element, a Description element, and an SProviderRegistrationServer element.

The ServiceProviderID attribute includes unique ID information of the service provider and uses a registered domain name as the ID to guarantee the uniqueness of the ID.

The Version attribute includes version information of this record.

The LogoURI attribute includes logo image information specifying a URI of a logo image of the service provider and can be selectively used.

The Name element may include name information of the service provider. The service provider may have one name for each language. To accomplish this, the Name element includes a Language attribute and the Language attribute includes information of respective names defined for different languages. Here, the Name element needs to include at least one Language attribute.

The Description element includes detailed text description information of the service provider and single text description information may be provided for each language, similar to the name information of the service provider. To accomplish this, the Description element includes a Language attribute. Here, the Description element may include a plurality of Language attributes. The Language attribute includes text description information. Here, the text description information can be selectively provided and may also not be provided.

The SProviderRegistrationServer element includes address information of a registration server of the service, provider. To accomplish this, the SProviderRegistrationServer, element may include a Location URL attribute and the Location URL attribute includes Registration Server address information. Here, for example, the Registration Server address information may be provided in URL format.

Figure 6:
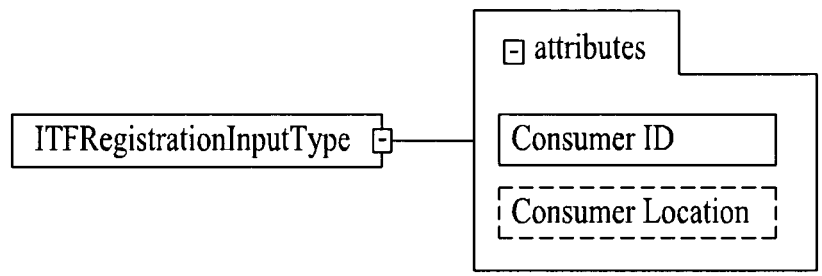
FIG. 6 illustrates a schema of a preferred embodiment of an ITF registration input type according to the present invention.

FIG. 6 illustrates a schema of a preferred embodiment of an ITF registration input type according to the present invention.

As shown in FIG. 6, the ITF Registration Input record includes a ConsumerID attribute and a ConsumerLocation attribute. Information transmitted from the ITF to the registration sever for registration can be carried in an ITF registration input type format.

The ConsumerID attribute includes unique subscriber ID information of the subscriber. A MAC address of the ITF may be used as the subscriber ID.

The ConsumerLocation attribute includes subscriber location information indicating the location of the subscriber. Through information included in the ConsumerLocation attribute, the registration server can determine the location of the subscriber and determine a corresponding region and can select and transmit flows suitable for the ITF according to the determined region. Here, the subscriber location information can be obtained through a DHCP option at the network attachment process.

Figure 7:
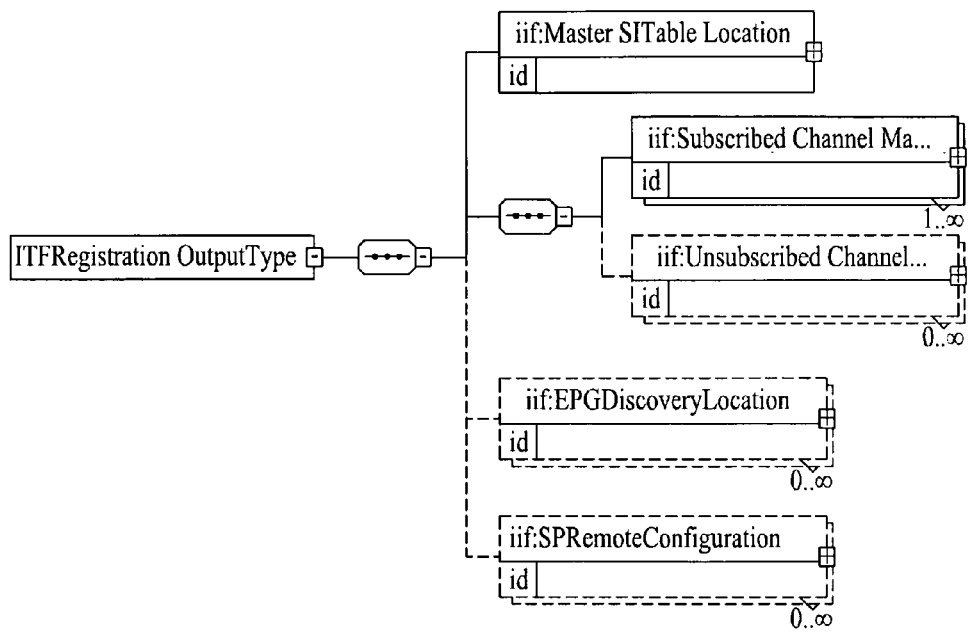
FIG. 7 illustrates a schema of a preferred embodiment of an ITF registration output type according to the present invention.

FIG. 7 illustrates a schema of a preferred embodiment of an ITF registration output type according to the present invention.

As shown in FIG. 7, the ITF registration output record includes a MasterSITableLocation element, a SubscribedChannelMap element, an UnsubscribedChannelMap element, an EPGDiscoveryLocation element, and an SPRemoteConfigurationServerLocation element. The information transmitted from the registration server to the ITF when authentication is successful may be carried in an ITF registration output type format.

The MasterSITableLocation element includes location information of a master SI table.

The SubscribedChannelMap element includes information of a map of channels joined by the customer. The service provider provides their channels in a format of a number of channel maps so that the customer can select one or more of the channel maps to join. The channel maps may be constructed in an internal channel map format that is not directly visible to the customer so that a list of channels joined by the customer is provided through a combination of channel maps.

The UnsubscribedChannelMap element includes information of a map of channels not joined by the customer. The service provider may need to provide the channel list for promotion although the customer cannot view the channels since they have not joined the channels. The service provider may selectively provide such channel maps.

The EPGDiscoveryLocation element includes EPG data provider information used to discovery EPG data. The EPG data provider information includes information of an address from which EPG data can be obtained. The EPG can be selectively provided and one or more EPGs may also be provided. Here, for example, the EPGDiscoveryLocation element may be defined as an EPG discovery record type.

The SPRemoteConfigurationServerLocation element includes information of an address of a remote configuration server provided by the service provider. When remote configuration server address information is present, the ITF needs to access a corresponding remote configuration server to perform a remote configuration process. Here, the remote configuration server performs the RCMS function described above.

Figure 8:
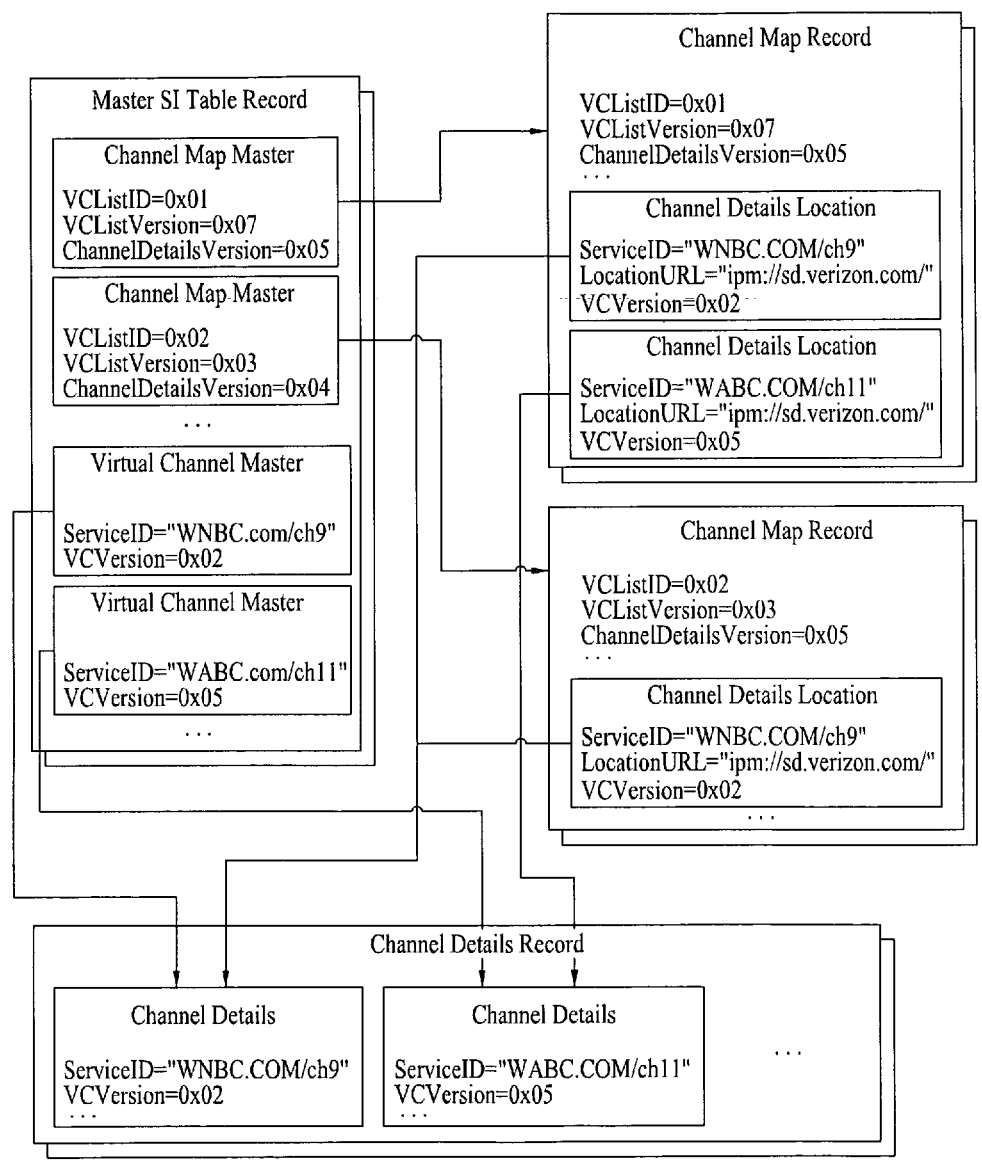
FIG. 8 illustrates relations between tables included in service information (SI)

FIG. 8 illustrates relations between tables included in service information (SI).

As shown in FIG. 8, a master SI table record contains pointers to the Virtual Channel Maps, which are necessary to start the Virtual Channel discovery process. The master SI table record allows ITF to detect any version changes of any part of the SI. To accomplish this, the master SI table record includes channel map management information. Herein, "Virtual Channel Maps" can be termed "Channel Maps" in IPTV service.

the master SI table record includes a channel map master containing version information of channel maps and a virtual channel master containing version information of channel details containing detailed information of channels. Here, the master SI table record may selectively include the virtual channel master.

Each channel map is uniquely identified by a VCListID and has two version information, i.e., VCListverion and ChannelDetailsVersion. The VCListversion is version information of the channel list of the channel map and is changed only when a channel is added or removed. The ChannelDetailsVersion is version information used to manage whether or not details information of channels included in the channel map have been changed and is changed only when the details information have been changed.

Only one master SI table record can be uniquely present for the service provider. However, when service configurations of regions are different, it will be more efficient to construct one individual master SI table record for each region. In this case, it is possible to provide a master SI table record suitable for a region to which the ITF belongs through the registration process.

In the example illustrated in FIG. 8, two channel maps are included in the master SI table record. The channel maps can be uniquely identified using VCListIDs. Each channel map may have one or more channels. Each channel map does not include details information of the channels but instead specifies locations from which the details information can be obtained. That is, each channel details location field in the channel map serves to specify the location of the channel details information.

A channel details record contains details of the channels which can be located by a channel details location field in the channel map. In addition to this method, a variety of methods as follows can be used to transfer the channel details location or record.

Methods of Transferring Channel Details Location or Record

1. Method of Globally Providing One Multicast Stream

In this method, a channel details record of all channels provided by the service provider is distributed through one global multicast stream. In this case, the channel details record can be provided by inserting the address of the global multicast stream into an ITFRegistrationOutputType element without the need to insert, an address of the details of each channel into the channel map as described above.

2. Method of Providing Channel Details Record for Each Region

While the above method 1 globally provides channel details through one stream, this method can provide channel details of each region through an individual multicast stream. In this case, since a region to which the ITF belongs can be specified through the registration process, it is possible to specify the address of a multicast stream unique to each region through the ITFRegistrationOutputType element.

3. Method of Specifying Default Channel Details Location in Channel Map

If all or part of details of channels belonging to one channel map can be obtained from the same address, it suffices to specify the address once in the channel map instead of specifying the address in each channel details location. In this case, if a channel, the details of which should be obtained from another address, is present, the address is again or additionally specified in the channel details location, thereby overriding the address specified in the channel map.

4. Method of Specifying Location of Details of Each Channel Through Channel Details Location Field as Shown in FIG. 5

In this method, details of channels belonging to each channel map are specified in each channel details location field. For example, for channels whose service IDs are "WNBC.COM/ch9" and "WNBC.COM/ch11", a LocationURL attribute in the channel details location field of the channel of "WNBC.COM/ch9" is specified as "ipm://sd.verizon.com" and a LocationURL attribute in the channel details location field of the channel of "WNBC.COM/ch11" is specified as "ipm://sd.verizon.com".

In order to search for details of each channel in transmitted channel details records, the serviceID in the channel details location field can serve as a unique ID of the details of each channel and it is possible to search for a channel details record of the channel through the serviceID of the channel details location field.

When channel details records are received in a multicast scheme, it is possible to join a corresponding stream and to search for the channel details record corresponding to the serviceID while repeatedly receiving records through the stream.

When a channel details record is received in a unicast scheme, it is possible to receive only a corresponding channel details record by transferring the serviceID as a parameter to the server to cause the server to transmit only the desired channel details record.

The master SI table record, the channel map record, and the channel details record are transferred through three separate flows in any of the push and pull modes.

Through the master SI table record, the ITF can manage updating of the channel map and the channel details. The ITF monitors the master SI table to determine whether or not the version of the channel map and the channel details has been changed. When the version has been changed, the ITF determines that the channel map and the channel details have been updated and thus can perform a process for updating the channel map and the channel details.

Here, whether or not the channel details have been updated can be determined using two methods. The first method determines whether or not the channel details have been updated using the channel details version of the channel map master of the master SI table record. That is, when the channel details version of the channel map master has been changed, it can be determined that the channel details have been updated. The second method determines whether or not the channel details have been updated using the channel details version of the channel map record. That is, a channel map record indicated by the channel map master is searched for and whether or not the channel details version of the channel map record has been changed is determined and whether or not the channel details have been updated is determined based on the determination. In the second method, the master SI table record does not need to include the virtual channel master and the channel map master does not need to include the channel details version.

Figure 9:
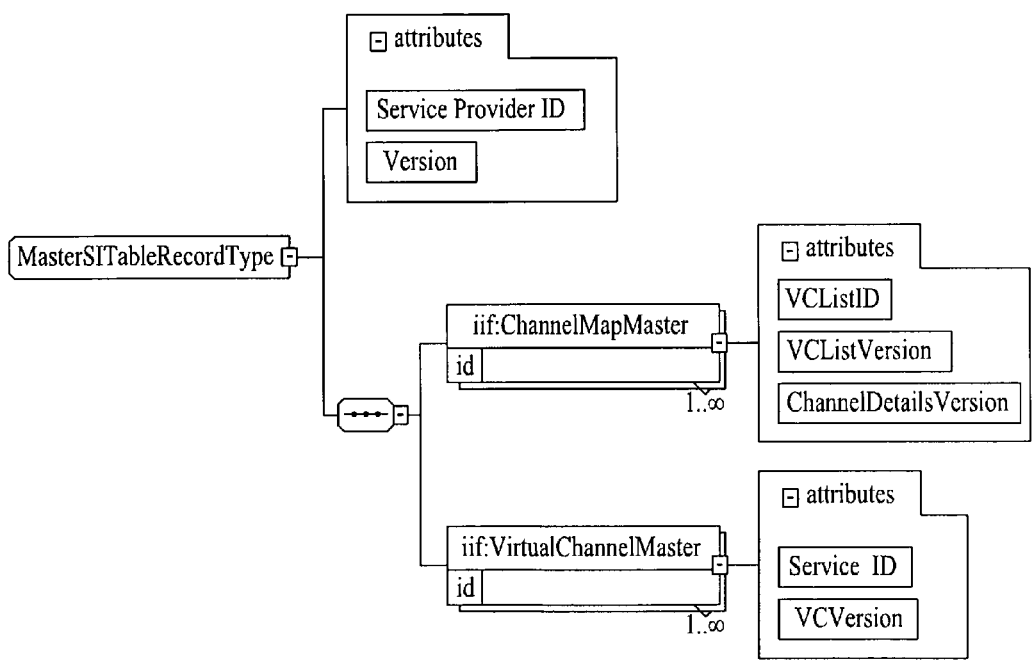
FIG. 9 illustrates a schema of a preferred embodiment of a master SI table record type.

FIG. 9 illustrates a schema of a preferred embodiment of a master SI table record type.

As shown in FIG. 9, the master SI table record includes channel map management information. To accomplish this, the master SI table record may include a ServiceProviderID attribute, a Version attribute, a ChannelMapMaster element, and a VirtualChannelMaster element. Here, the VirtualChannelMaster element may be selectively included in the master SI table record.

The ServiceProviderID attribute includes service provider identification information that enables unique identification of the service provider and a registered domain name can be used as the service provider ID.

The Version attribute includes version information of the master SI table record. Using the version information included in the Version attribute, it is possible to determine whether or not the master SI table record has been updated.

The ChannelMapMaster element includes information used to receive the channel map. That is, The ChannelMapMaster element includes a pointer to channel map instance. The master SI table record contains one or more pointer for pointing one or more channel map records. Based on information included in the ChannelMapMaster element, it is possible to receive the channel map record and to determine whether or not the channel map has been updated. To accomplish this, the ChannelMapMaster element may include a VCListID attribute, a VCListVersion attribute, and a ChannelDetailsVersion attribute. The VCListID attribute includes identification information that uniquely identifies the channel map instance. The VCListVersion attribute includes version information indicating whether or not channel lists included in the channel map have been changed. Here, version information included in the VCListVersion attribute is changed when a channel is added or removed. The ChannelDetailsVersion attribute includes version information indicating whether or not details of each channel included in the channel map have been changed. Here, version information included in the ChannelDetailsVersion attribute is changed when the details of the channel are changed.

The VirtualChannelMaster element includes a ServiceID attribute and a VCVersion attribute. The ServiceID attribute includes identification information that uniquely identifies the service. Based on information included in the ServiceID attribute, it is possible to search for a desired channel details record. The VCVersion attribute includes version information of channel details.

Figure 10:
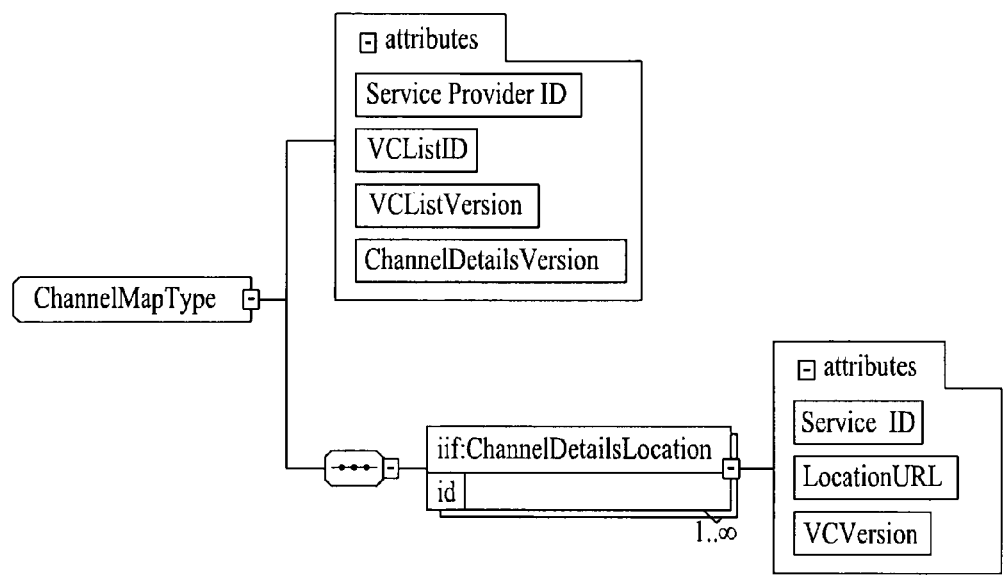
FIG. 10 illustrates a schema of a preferred embodiment of a channel map type.

FIG. 10 illustrates a schema of a preferred embodiment of a channel map type.

As shown in FIG. 10, the channel map contains channel map information and does not include details of channels and serves as a package of channels. Here, the channel map of FIG. 10 illustrates the fourth of the 4 channel details transmission methods described above with reference to FIG. 8 in which an individual address is specified for details of each channel. Also, channel map information can be channel map instance.

The channel map record includes a channel map instance. To accomplish this, the channel map record includes a ServiceProviderID attribute, VCListID attribute, a VCListversion attribute, a ChannelDetailsVersion attribute, and a ChannelDetailsLocation element.

The ServiceProviderID attribute includes service provider identification information that enables unique identification of the service provider and a registered domain name can be used as the service provider ID.

The VCListID attribute includes identification information that uniquely identifies the channel map.

The VCListversion attribute includes version information indicating whether or not channel lists included in the channel map have been changed. Here, version information included in the VCListversion attribute is changed when a channel is added or removed.

The ChannelDetailsVersion attribute includes version information indicating whether or not details of each channel included in the channel map have been changed. Here, the version information included in the ChannelDetailsVersion attribute is changed when details of a channel are changed.

The ChannelDetailsLocation element includes location information of details of each channel. To accomplish this, the ChannelDetailsLocation element includes a ServiceID attribute, a LocationURL attribute, and a VCVersion attribute. The ServiceID attribute includes identification information that uniquely identifies the service. Based on information included in the ServiceID attribute, it is possible to search for the channel details record. The LocationURL attribute includes information of an address from which details of the service can be obtained. The VCVersion attribute includes version information of channel details.

Figure 11:
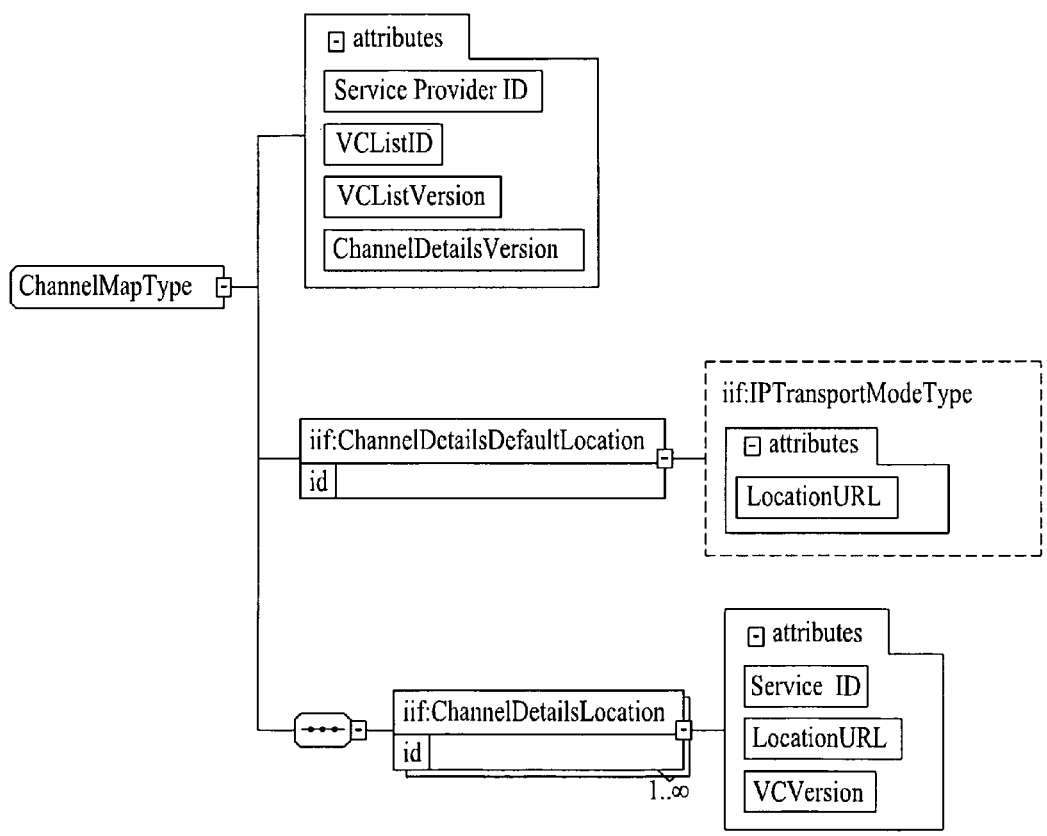
FIG. 11 illustrates a schema of another preferred embodiment of a channel map type.

FIG. 11 illustrates a schema of another preferred embodiment of a channel map type.

As shown in FIG. 11, the channel map contains channel map information and serves as a package of channels. The channel map does not include details of each channel but instead includes information of a default location of details of the channel. Here, the channel map of FIG. 11 illustrates the third of the 4 channel details transmission methods described above with reference to FIG. 8 in which a default channel details location is specified in the channel map. Also, channel map information can be channel map instance.

The channel map record includes channel map instance. To accomplish this, the channel map record may includes a ServiceProviderID attribute, VCListID attribute, a VCListversion attribute, a ChannelDetailsVersion attribute, a ChannelDetailsDefaultLocation element, and a ChannelDetailsLocation element.

The ServiceProviderID attribute includes service provider identification information that enables unique identification of the service provider and a registered domain name can be used as the service provider ID.

The VCListID attribute includes identification information that uniquely identifies the channel map.

The VCListVersion attribute includes version information indicating whether or not channel lists included in the channel map have been changed. Here, version information included in the VCListVersion attribute is changed when a channel is added or removed.

The ChannelDetailsVersion attribute includes version information indicating whether or not details of each channel included in the channel map have been changed. Here, the version information included in the ChannelDetailsVersion attribute is changed when details of a channel are changed.

The ChannelDetailsDefaultLocation element includes default location information of details of each channel belonging to the channel map. To accomplish this, the ChannelDetailsDefaultLocation element includes a LocationURL attribute. The LocationURL attribute includes default location information. Here, the default location information includes an address from which all or part of details of each channel belonging to the channel map can be obtained. If a channel, the details of which should be obtained from another address, is present, location information of the details of the channel can be overridden in the ChannelDetailsLocation element.

The ChannelDetailsLocation element includes location information of details of each channel. That is, if there are details of a channel which cannot be obtained from default location information included in the ChannelDetailsDefaultLocation element, the ChannelDetailsLocation element includes location information of details of the channel. To accomplish this, the ChannelDetailsLocation element includes a ServiceID attribute, a LocationURL attribute, and a VCVersion attribute. The ServiceID attribute includes identification information that uniquely identifies the service. Based on information included in the ServiceID attribute, it is possible to search for the channel details record. The LocationURL attribute includes information of an address from which details of the service can be obtained. The VCVersion attribute includes version information of channel details.

Figure 12A:
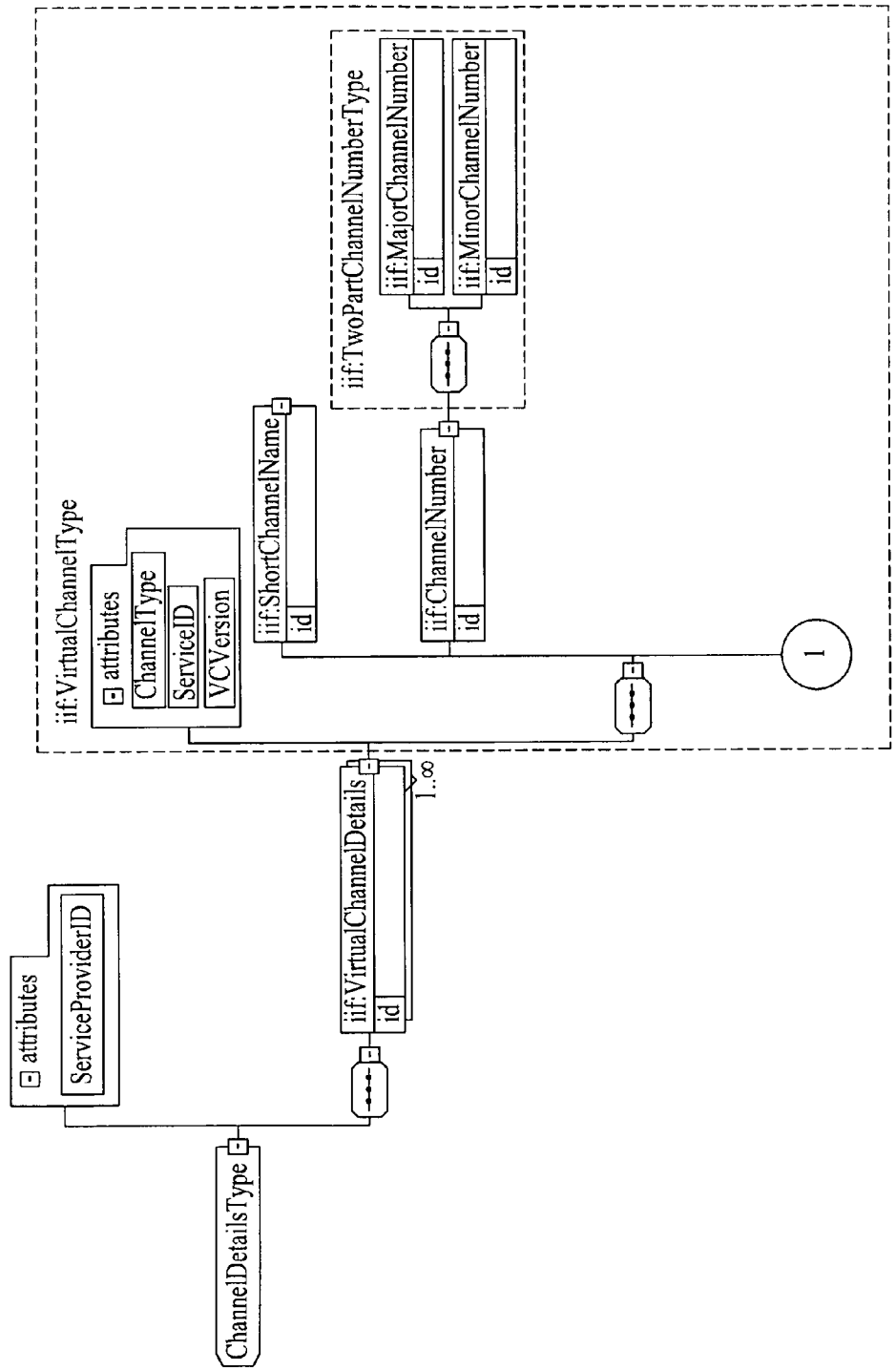
FIGS. 12A and 12B illustrate schemas of another; preferred embodiment of a channel details type.
Figure 12B:
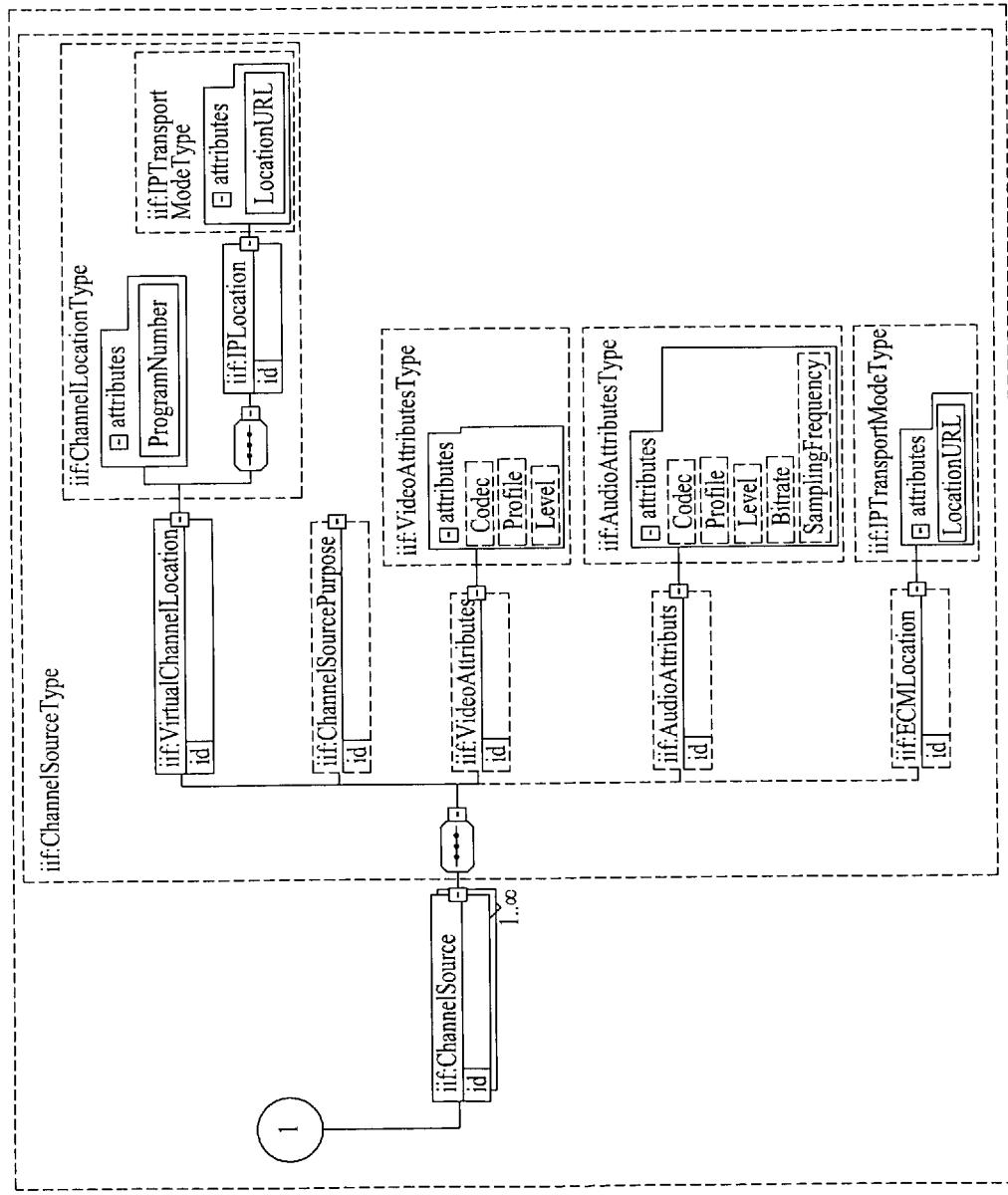

FIGS. 12A and 12B illustrate schemas of another preferred embodiment of a channel details type.

As shown in FIGS. 12A and 12B, the channel details record includes details of each channel included in the channel map. To accomplish this, the channel details record includes a ServiceProviderID attribute and a VirtualChannelDetails element.

The ServiceProviderID attribute includes service provider identification information that enables unique identification of the service provider.

The VirtualChannelDetails element includes details of each channel. To accomplish this, the VirtualChannelDetails element includes a ChannelType attribute, a ServiceID attribute, a VCVersion attribute, a ShortChannelName element, a ChannelNumber element, and a ChannelSource element. Here, the ChannelSource element may be selectively included in the VirtualChannelDetails element. When the ChannelSource element is not included in the VirtualChannelDetails element, the ChannelSource element can be separately transmitted through a separate ChannelSource record and the VirtualChannelDetails element may include location information and identification information that can be used to receive the ChannelSource record.

The ChannelType attribute includes service type information indicating the service type of the channel and the service type information indicates whether the corresponding channel is a video channel, an audio channel, or a data broadcast channel.

The ServiceID attribute includes identification information that uniquely identifies the service. Based on information included in the ServiceID attribute, it is possible to search for a desired channel details record.

The VCVersion attribute includes version information of channel details.

The ShortChannelName element includes a channel name expressed by short text including 7 characters or less. For example, the ShortChannelName element may have a value of "WABC".

The ChannelNumber element includes a corresponding channel number. Since the present invention can support both a one-part channel number and a two-part channel number, the corresponding channel number may be either a one-part channel number or a two-part channel number. To accomplish this, the ChannelNumber element may include a MajorChannelNumber element including physical channel information and a MinorChannelNumber including logical channel information.

The ChannelSource element includes information specifying an actual source of the corresponding channel. To accomplish this, the ChannelSource element includes a VirtualChannelLocation element, a ChannelSourcePurpose element, a VideoAttribute element, an AudioAttributes element, and an ECMLocation element.

The VirtualChannelLocation element includes information of a transport protocol and an IP address from which the source of the channel can be received. To accomplish this, the VirtualChannelLocation element includes a ProgramNumber attribute and an IPLocation element. By selectively supporting the ProgramNumber attribute, it is possible to guarantee extension to the MPTS and also to provide a chance for the customer to check whether or not a received stream is a desired stream in the case of SPTS. The IPLocation element includes a Location URL attribute including information of a URL from which the source of the channel can be received.

The ChannelSourcePurpose element includes source type information indicating the characteristics of the channel and may include a plurality of source type information. The source type information may have one of the values of "HD", "SD", "PIP", and "Barker". The Barker channel is a channel for advertisement or publicity and is automatically selected when the customer cannot view the channel since they are not authorized for the channel. The Barker channel serves to provide publicity of the channel and guidance to join the channel. The Barker channel includes at least one of the values of "HD Barker", "SD Barker", and "PIP Barker".

One channel may have one source for each value specified by the ChannelSourcePurpose element. That is, when the ChannelSourcePurpose element includes both one "HD" and one "SD", one channel may have one HD source and one SD source. However, since one channel does not need to include two HD sources, the ChannelSourcePurpose element does not include two HDs.

The VideoAttributes element includes video attribute information of a corresponding source. To accomplish this, the VideoAttributes element includes a Codec attribute including video codec information, a Profile attribute including video including profile information, and a Level attribute including video level information.

The AudioAttributes element includes audio attribute information of a corresponding source. To accomplish this, the AudioAttributes element includes a Codec attribute including audio codec information, a Profile attribute including audio profile information, a Level attribute including audio level information, a Bitrate attribute including audio bitrate information, and SamplingFrequency information including audio sampling frequency information.

Through the video attribute information included in the VideoAttribute element and the audio attribute information included in the AudioAttributes element, it is possible to select and view a source optimal for the functionality of the ITF.

The ECMLocation element includes information of an address from which ECM information can be received.

Figure 13:
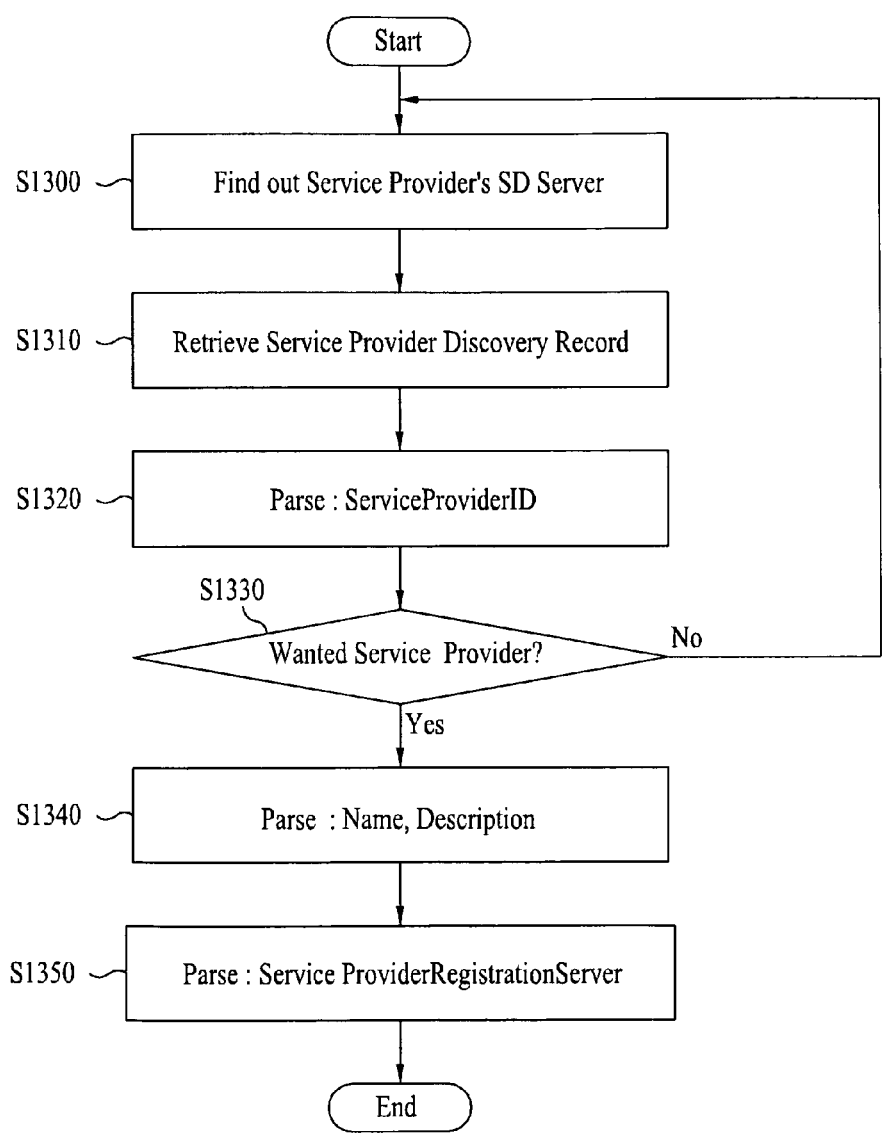
FIG. 13 is a flow chart illustrating a procedure of a preferred embodiment of service provider discovery according to the present invention.

FIG. 13 is a flow chart illustrating a procedure of a preferred embodiment of service provider discovery according to the present invention.

As shown in FIG. 13, the ITF searches for a Server Discovery (SD) server (S1300). Here, the ITF can search for an SD server according to the SD server address list search method described above with reference to FIG. 4.

The ITF accesses the SD server based on the SD server address list and obtains a service provider discovery record from the SD server (S1310). Here, the service provider discovery record may be that described above with reference to FIG. 5. The ITF can receive the service provider discovery record from the SD server in a push mode or in a pull mode.

The ITF parses a ServiceProviderID attribute of the received service provider discovery record to read service provider identification information included in the ServiceProviderID attribute (S1320).

Based on the read service provider identification information, the ITF determines whether or not the corresponding service provider is that from which the ITF desires to receive a service (S1330). When the corresponding service provider is not that from which the ITF desires to receive a service, the ITF performs the process of step S1300 to search for another SD server from the SD server address list.

When the corresponding service provider is that from which the ITF desires to receive a service, the ITF parses a name attribute and a description attribute of the service provider discovery record to read name information of a service provider included in the name attribute and detailed text description information of the service provider included in the description attribute (S1340).

The ITF parses an SProviderRegistrationServer element in the provider discovery record to read address information of a registration server of the service provider included in the SProviderRegistrationServer element (S1350). Based on the read registration server address information, the ITF can access the registration server to perform an ITF registration process.

Figure 14:
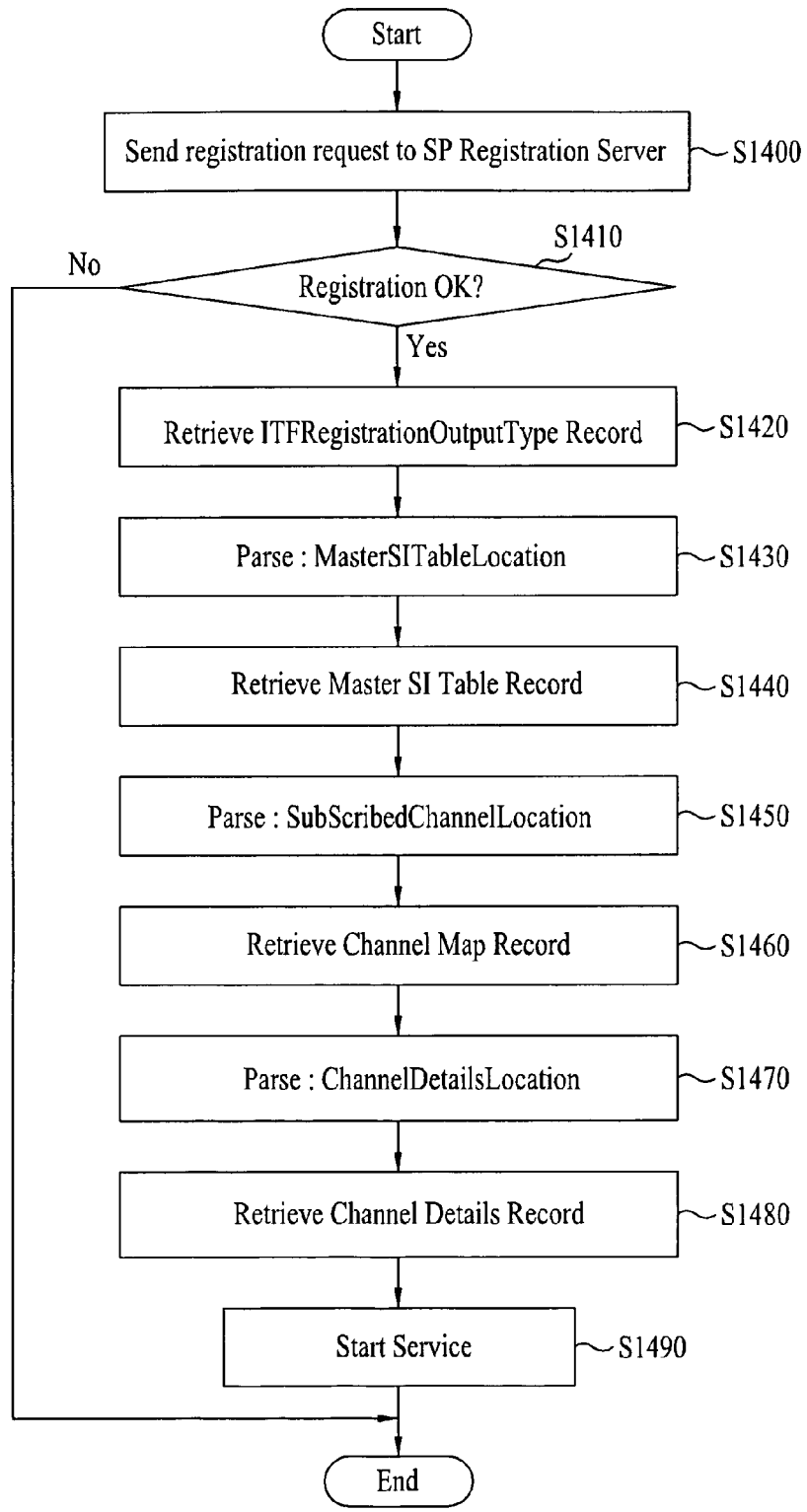
FIG. 14 is a flow chart illustrating a procedure of a preferred embodiment of service provider registration and service discovery according to the present invention.

FIG. 14 is a flow chart illustrating a procedure of a preferred embodiment of service provider registration and service discovery according to the present invention.

As shown in FIG. 14, the ITF transmits a registration request to the registration server specified by the registration server address information included in the service provider discovery record (S1400). Here, the ITF can transmit the ITFRegistrationInputType record described above with reference to FIG. 6 in the registration request.

The registration server receives the registration request and determines whether or not to register the ITF (S1410). Here, the registration server can receive the ITFRegistrationInputType record in the registration request and can determine whether or not to register the ITF based on subscriber identification information and subscriber location information included in the ITFRegistrationInputType record.

When registration is approved, the ITF retrieves an ITFRegistrationOutputType record (S1420). Here, the ITFRegistrationOutputType record may be the ITFRegistrationOutputType record described above with reference to FIG. 7 and information included in the TFRegistrationOutputType record is pre-customized using information included in the ITFRegistrationInputType record.

The ITF parses a MasterSITableLocation element in the retrieved ITFRegistrationOutputType record and reads location information of a master SI table included in the MasterSITableLocation element (S1430).

The ITF retrieves a master SI table record based on the read location information of the master SI table (S1440). Here, the retrieved master SI table record may be that described above with reference to FIG. 9.

The ITF parses a SubscribedChannelMap element in the retrieved ITFRegistrationOutputType record and reads information of a channel map joined by the customer included in the SubscribedChannelMap element (S1450). Here, the ITF can read channel map location information required to receive the channel map joined by the customer from the ChannelMapMaster element in the master SI table record.

The ITF retrieves a channel map record based on the read channel map location information (S1460). Here, the retrieved channel map record may be at least one of the channel map record described above with reference to FIG. 10 and the channel map record described above with reference to FIG. 11.

The ITF parses the ChannelDetailsLocation element in the retrieved channel map record to read location information of details of each channel included in the ChannelDetailsLocation element (S1470).

The ITF retrieves a channel details record based on the read location information of the details of each channel (S1480). Here, the retrieved channel details record may be that illustrated in FIGS. 12A and 12B.

The ITF then starts the received service (S1490).

Figure 15:
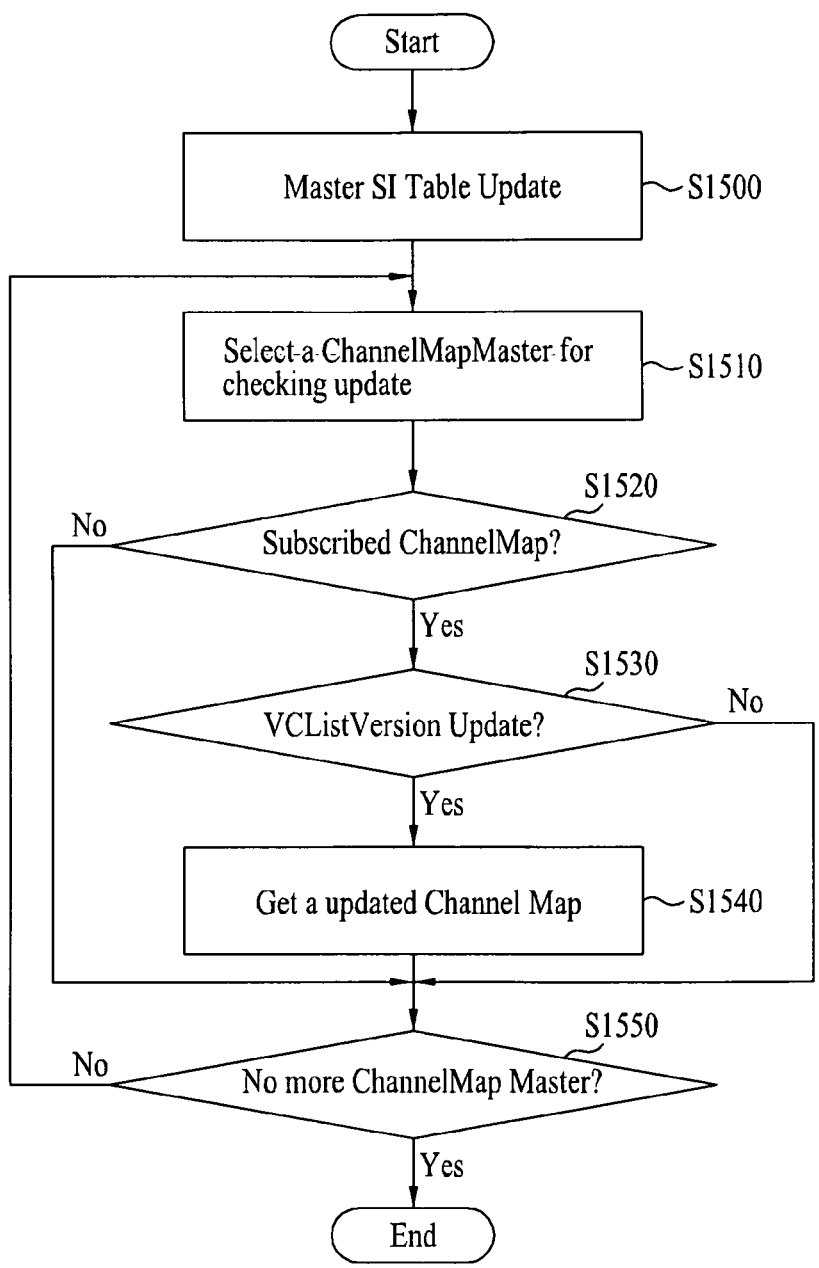
FIG. 15 is a flow chart illustrating a procedure of a preferred embodiment of a method for performing update of a master SI table.

FIG. 15 is a flow chart illustrating a procedure of a preferred embodiment of a method for performing update of a master SI table.

As shown in FIG. 15, the ITF updates a master SI table (S1500). The ITF can monitor the master SI table in real time to check whether or not the version of the received master SI table has been changed. When the version of the received master SI table has been changed, the ITF updates the master SI table based on information included in the received master SI table.

The ITF selects the ChannelMapMaster element for updating from among ChannelMapMaster elements included in the master SI table (S1510).

The ITF checks whether or not the ChannelMapMaster element selected by the ITF includes information used to receive the channel map joined by the customer (S1520). To accomplish this, the ITF can use information of a channel map joined by the customer included in the SubscribedChannelMap element in the ITFRegistrationOutputType record.

When the selected ChannelMapMaster element includes information used to receive the channel map joined by the customer, the ITF checks whether or not version information included in a VCListVersion attribute in the selected ChannelMapMaster element has been changed (S1530). When version information included in the VCListVersion attribute has been changed, the ITF receives the updated channel map record and updates a channel map using information included in the received channel map record (S1540).

The ITF then checks whether or not an unselected channelMapMaster element is included in the master SI table (S1550). When an unselected channelMapMaster element is included in the master SI table, the ITF returns to step S1510.

Figure 16:
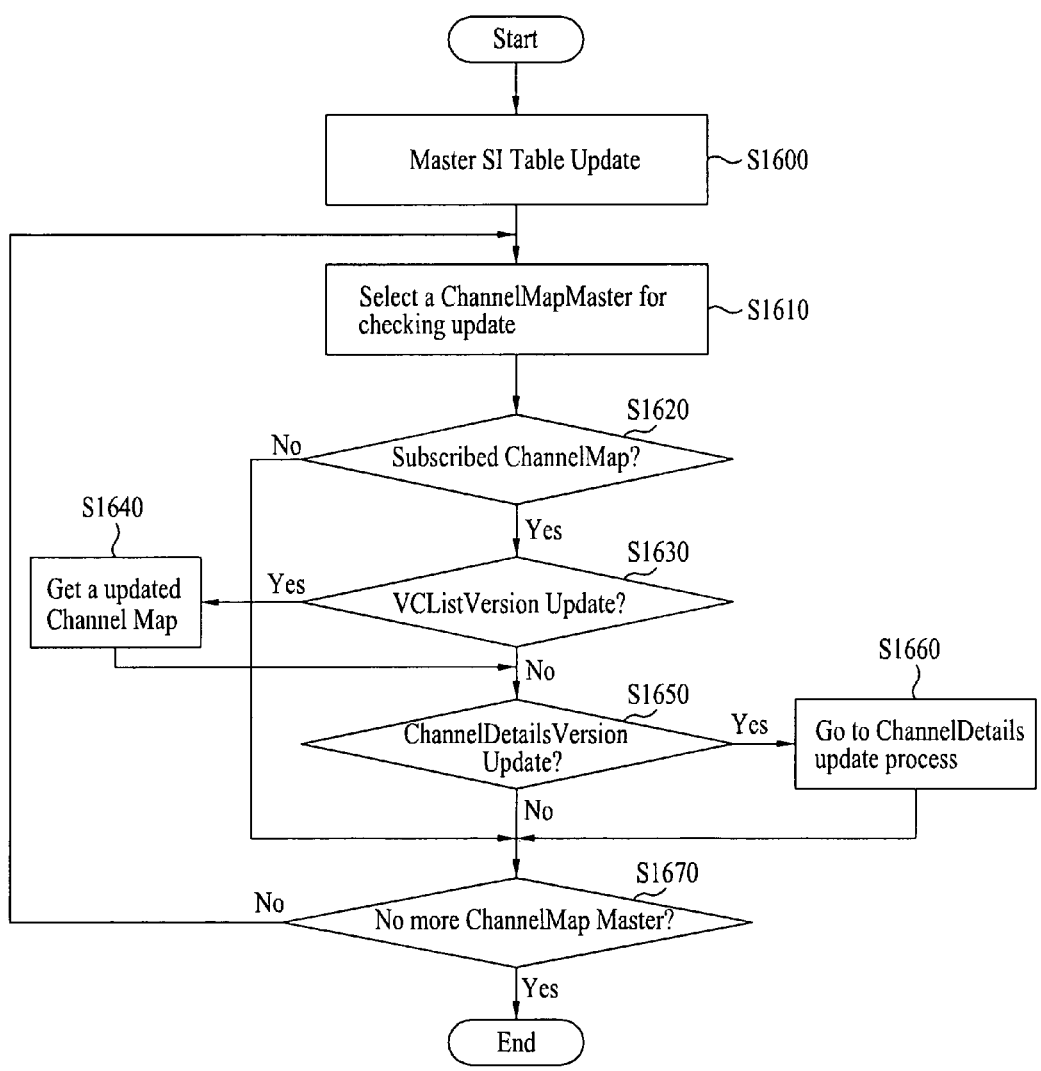
FIG. 16 is a flow chart illustrating a procedure of another preferred embodiment of a method for performing update of a master SI table.

FIG. 16 is a flow chart illustrating a procedure of another preferred embodiment of a method for performing update of a master SI table.

As shown in FIG. 16, the ITF updates a master SI table (S1600). The ITF can monitor the master SI table in real time to check whether or not the version of the received master SI table has been changed. When the version of the received master SI table has been changed, the ITF updates the master SI table based on information included in the received master SI table.

The ITF selects the ChannelMapMaster element for updating from among ChannelMapMaster elements included in the master SI table (S1610).

The ITF checks whether or not the ChannelMapMaster element selected by the ITF includes information used to receive the channel map joined by the customer (S1620). To accomplish this, the ITF can use information of a channel map joined by the customer included in the SubscribedChannelMap element in the ITFRegistrationOutputType record.

When the selected ChannelMapMaster element includes information used to receive the channel map joined by the customer, the ITF checks whether or not version information included in a VCListVersion attribute in the selected ChannelMapMaster element has been changed (S1630). When version information included in the VCListVersion attribute has been changed, the ITF receives the updated channel map record and updates a channel map using information included in the received channel map record (S1640).

The ITF checks whether or not version information included in the ChannelDetailsVersion attribute in the selected ChannelMapMaster element has been changed (S1650). When the version information included in the ChannelDetailsVersion attribute has been changed, the ITF performs a channel details update process (S1660).

The ITF then checks whether or not an unselected channelMapMaster element is included in the master SI table (S1670). When an unselected channelMapMaster element is included in the master SI table, the ITF returns to step S1610.

Figure 17:
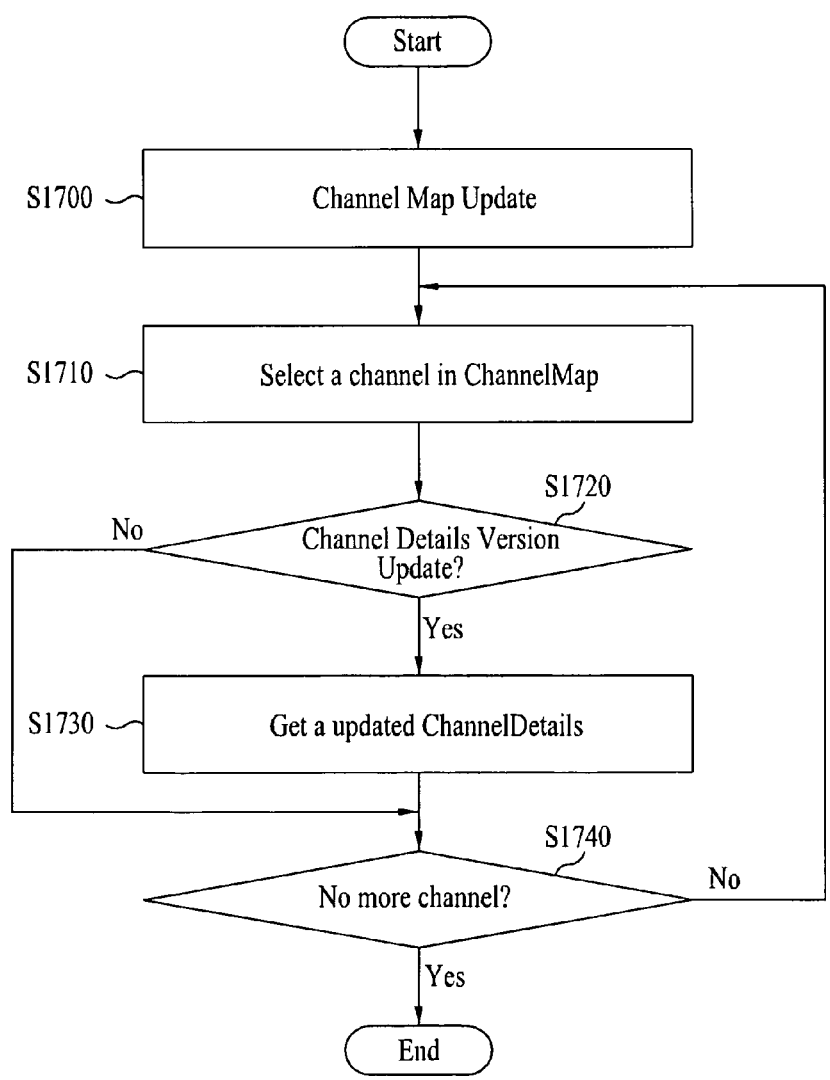
FIG. 17 is a flow chart illustrating a procedure of a preferred embodiment of a method for performing update of a channel details version.

FIG. 17 is a flow chart illustrating a procedure of a preferred embodiment of a method for performing update of a channel details version.

As shown in FIG. 17, the ITF updates the channel map (S1700).

The ITF selects a channel from the channel map (S1710). Here, the ITF can also select a ChannelDetailsLocation element including location information of details of the channel selected from the channel map.

The ITF checks whether or not version information included in the VCVersion attribute in the selected ChannelDetailsLocation element has been changed (S1720). When the version information has been changed, the ITF receives the updated channel details record and updates the channel details of the selected channel based on information included in the received channel details record (S1730).

The ITF checks whether or not an unselected channel is included in the channel map (S1740). When an unselected channel is included in the channel map, the ITF returns to step S1710.

Figure 18:
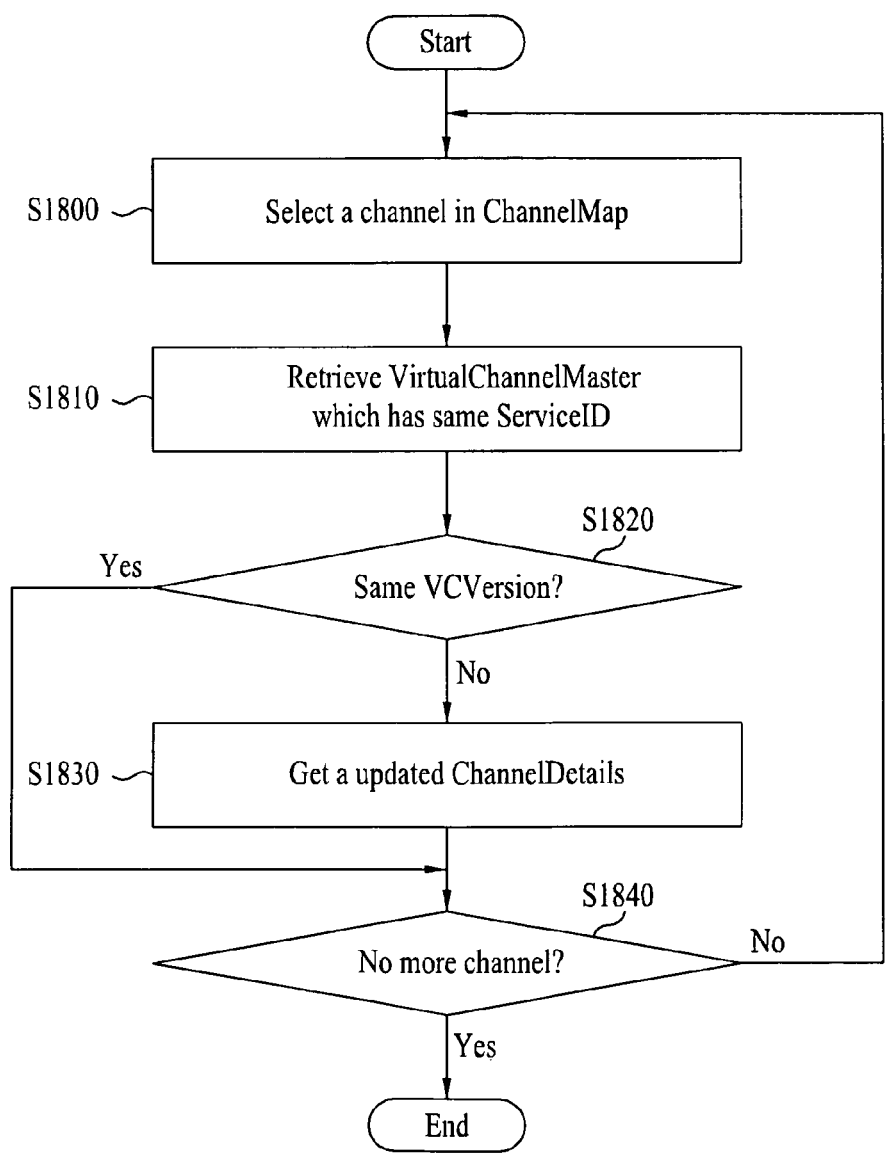
FIG. 18 is a flow chart illustrating a procedure of another preferred embodiment of a method for performing update of a channel details version.

FIG. 18 is a flow chart illustrating a procedure of another preferred embodiment of a method for performing update of a channel details version.

As shown in FIG. 18, the ITF selects a channel from the channel map (S1800). Here, the ITF can also select a ChannelDetailsLocation element including location information of details of the channel selected from the channel map.

The ITF searches the master SI table MasterSITable for a virtual channel master element including a ServiceID attribute including the same identification information as that included in a ServiceID attribute in the selected ChannelDetailsLocation element (S1810).

The ITF determines whether or not version information included in the found virtual channel master element is identical to version information included in the VCVersion attribute in the selected ChannelDetailsLocation element (S1820). When the two version information are different, the ITF receives the updated channel details record and updates channel details of the selected channel based on information included in the received channel details record (S1830).

The ITF checks whether or not an unselected channel is included in the channel map (S1840). When an unselected channel is included in the channel map, the ITF returns to step S1800.

Figure 19:
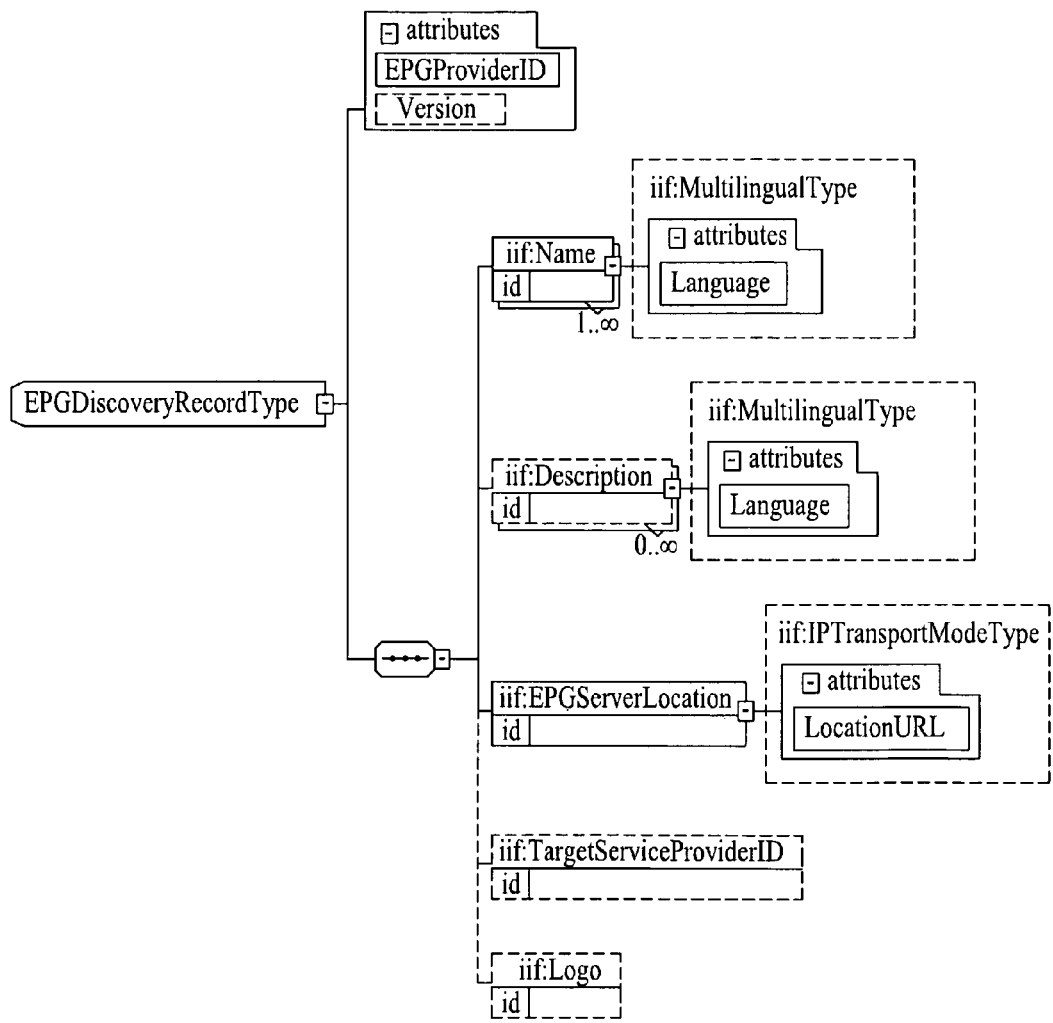
FIG. 19 illustrates a schema of a preferred embodiment of an EPG discovery record type according to the present invention.

FIG. 19 illustrates a schema of a preferred embodiment of an EPG discovery record type according to the present invention.

As shown in FIG. 19, the EPG discovery record includes EPG discovery information used to discovery EPG data. To accomplish this, the EPG discovery record includes an EPGProviderID attribute, a Version attribute, a Name element, a Description element, an EPG ServerLocation element, a TargetServiceProviderID element, and a Logo element.

The EPGProviderID attribute includes identification information that enables unique identification of an EPG data provider. Here, a registered domain name can be used as the identification information.

The Version attribute includes version information of an EPG discovery record.

The Name element includes information of a text name of the EPG data provider and the EPG data provider may have one name for each language. To accomplish this, the Name element includes a Language attribute. The Name element may also include a plurality of Language attributes and each of the Language attributes includes information of a text name of the EPG data provider defined for each language.

The Description element includes detailed text description information of the EPG data provider and single text description information may be provided for each language, similar to the information of the name of the EPG data provider. To accomplish this, the Description element includes a Language attribute. The Description element may include a plurality of Language attributes and each of the Language attributes includes text description information defined for each language.

The EPG ServerLocation element includes information of an IP address from which EPG data can be received and information of a protocol used to receive the EPG data.

The TargetServiceProviderID element includes ID information of service providers supported by the EPG data provider.

The Logo element includes location information of a logo of the EPG data provider. Here, the logo location information may be provided in a URI format.

Figure 20:
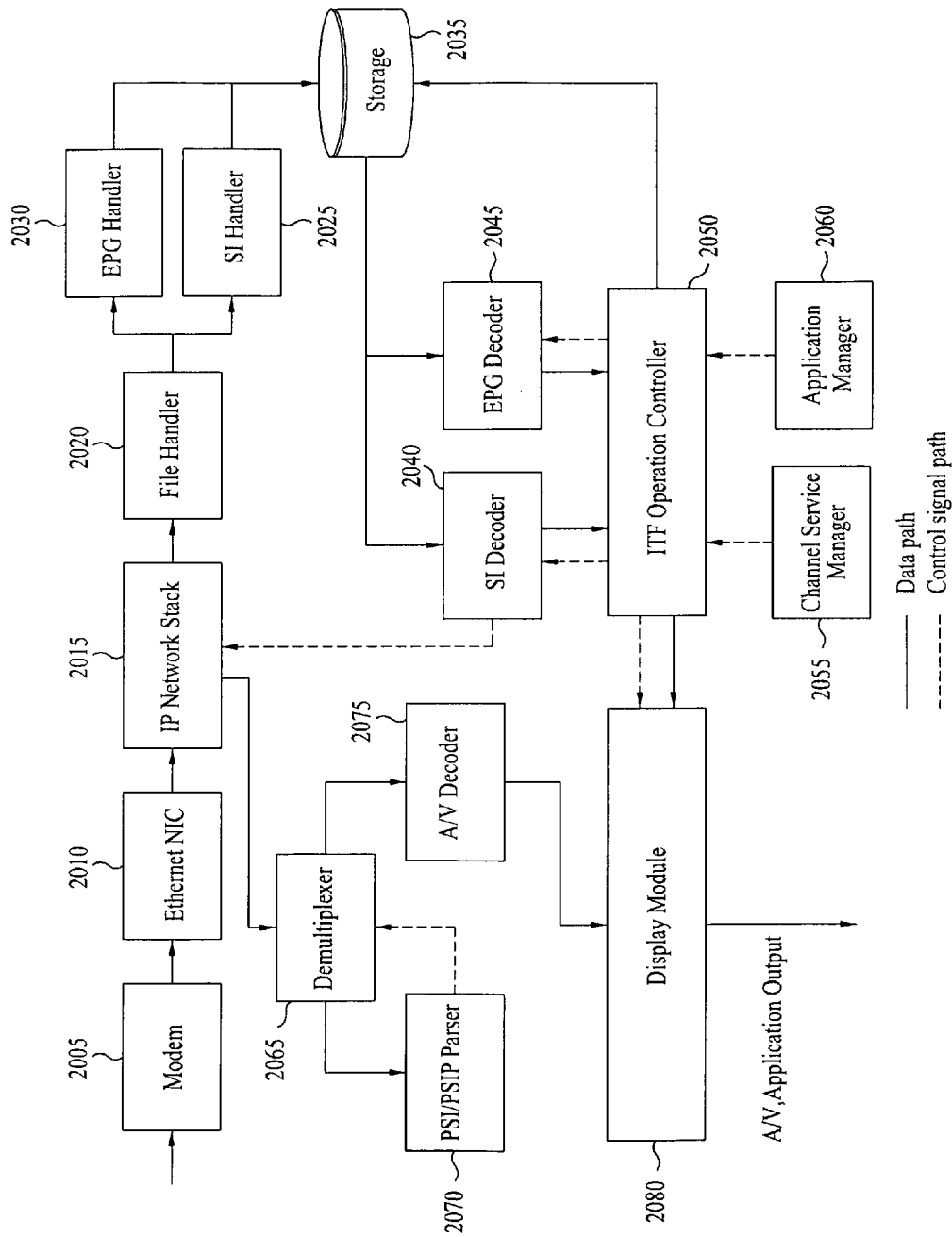
FIG. 20 is a block diagram illustrating a configuration of a preferred embodiment of an IPTV Terminal Function (ITF) according to the present invention.

FIG. 20 is a block diagram illustrating a configuration of a preferred embodiment of an IPTV Terminal Function (ITF) according to the present invention.

As shown in FIG. 20, the ITF includes an IP network stack 2015, a file handler 2020, an SI handler 2025, an EPG handler 2030, a storage 2035, an SI decoder 2040, an EPG decoder 2045, an ITF operation controller 2050, a channel service manager 2055, an application manager 2060, a demultiplexer 2065, a PSI/PSIP parser 2070, an A/V decoder 2075, and a display module 2080. Here, a network interface may include a modem 2005 and an Ethernet Network Interface Card (NIC) 2010.

The modem 2005 serves as an interface through which the ITF connects to the IP network at the physical level. The modem 2005 demodulates a signal received through a physical modem to reconstruct the received signal into a digital signal and modulates a digital signal for transmission to the service provider and outputs the modulated digital signal to the IP network. The modem 2005 may be implemented as a cable modem, a DSL modem, or the like.

The Ethernet NIC 2010 reconstructs a digital signal received through the modem 2005 into an IP packet and outputs the IP packet to the IP network stack 2015. The Ethernet NIC 2010 also encapsulates an IP packet output from the IP network stack 2015 into an Ethernet datagram and outputs the Ethernet datagram to the modem 2005.

The IP network stack 2015 handles a processing module of each layer according to the IP protocol stack. The IP network stack 2015 involves transfer of packets received and transmitted by the ITF from a source to a destination. The IP network stack 2015 classifies each received packet according to an appropriate protocol and outputs the classified packet to the file handler 2020 and demultiplexer 2065. For example, when the IP network stack 2015 receives a packet including one of a service provider discovery record, an ITF registration output record, a master SI table record, a channel map record, a channel details record, and an EPG discovery record, the IP network stack 2015 outputs data included in the packet to the file handler 2020. The IP network stack 2015 converts the ITF registration input record into an IP packet and outputs the IP packet to the Ethernet NIC 2010 so that it is transmitted to the service provider.

The file handler 2020 collects data output from the IP network stack 2015 and reconstructs the data into a file format. Here, the file handler 2020 can reconstruct data output from the IP network stack 2015 into a file format using FLUTE. That is, the service provider can transmit a file using FLUTE and the file handler 2020 can receive the file transmitted by the service provider using FLUTE. The file handler 2020 classifies and outputs the reconstructed file to one of the SI handler 2025 and the EPG handler 2030.

The SI handler 2025 processes a portion corresponding to IPTV SI data among the file-format data received from the file handler 2020 and stores the processed data in the storage 2035. Here, the IPTV SI data may be at least one of a service provider discovery record, an ITF registration output record, a master SI table record, a channel map record, a channel details record, and an EPG discovery record.

The EPG handler 2030 can process a portion corresponding to IPTV EPG data among the file-format data received from the file handler 2020 and store the processed data in the storage 2035. Here, the EPG handler 2030 can receive the IPTV EPG data using information included in the EPG discovery record.

The storage 2035 stores SI provided by the SI handler 2025, an EPG provided by the EPG handler 2030, data provided by the ITF operation controller 2050, etc.

The SI decoder 2040 decodes SI data stored in the storage 2035 to reconstruct required information and provides the reconstructed information to the ITF operation controller 2050. From the service provider discovery record, the SI decoder 2040 reads useful IPTV service provider information and information used to access the service provider through a network that is under security management. For example, the SI decoder 2040 can parse the service provider discovery record to read registration server address information included in the service provider discovery record.

The SI decoder 2040 can parse the ITF registration output record to read information included in the ITF registration output record. For example, the SI decoder 2040 can read address information used to receive the master SI table record and EPG discovery information used to discovery EPG data included in the ITF registration output record.

The SI decoder 2040 can also parse the master SI table record to read information used to receive a channel map record and a channel details record, version information of the channel map record, and version information of the channel details record included in the management SI table record.

The SI decoder 2040 can also read channel map information from the channel map record and can read channel details information of the corresponding channel from the channel details record.

When EPG information is required, the EPG decoder 2045 reads and analyzes EPG data stored in the storage 2035 to reconstruct original EPG data. The EPG decoder 2045 provides the reconstructed EPG data to the ITF operation controller 2050.

The ITF operation controller 2050 controls operations of the ITF. The ITF operation controller 2050 controls the SI decoder 2040, the EPG decoder 2045, and the display module 2080 and processes requests input from the channel service manager 2055 and the application manager 2060.

The ITF operation controller 2050 controls the SI decoder 2040 to create a channel map and selects a channel using the channel map according to a key input received from the channel service manager 2055. The ITF operation controller 2050 then controls the IP network stack 2015 to allow the selected channel to be received. Also, The ITF operation controller 2050 controls PSI/PSIP Parser 2070 to allow the selected channel to be received. Also, The ITF operation controller 2050 controls IP Network Stack 2015 to allow the selected channel to be received The channel service manager 2055 receives a channel request signal from a customer and provides the input request signal to the ITF operation controller 2050 so that the channel is switched to the requested channel.

The application manager 2060 manages overall states and provides a user interface. When an EPG display request has been received from the customer through the user interface, the application manager 2060 provides the EPG display request to the ITF operation controller 2050 to allow the display module 2080 to display the EPG.

The demultiplexer 2065 demultiplexes the received packet into audio data, video data, and Program Specific Information (PSI) data and transmits the audio and video data and the PSI data to the A/V decoder 2075 and the PSI/PSIP parser 2070. That is, the demultiplexer 2065 extracts MPEG-2 transport stream data from the IP packet received from the IP network stack 2015 and transfers the data to the PSI/PSIP parser 2070 or the A/V decoder 2075 according to a corresponding PID.

The PSI/PSIP parser 2070 extracts and parses PSI/PSIP data containing information that can be used to access a program element such as PID information of each data item (for example, A/V data) of an MPEG-2 transport stream in the IP datagram received from the multiplexer 2065. The PSI/PSIP parser 2070 can also control the demultiplexing process of the application manager 2060 based on the extracted PSI/PSIP data.

The A/V decoder 2075 decodes video data and audio data received from the demultiplexer 2065. To accomplish this, the A/V decoder 2075 may include an audio decoder and a video decoder. The audio data decoded by the audio decoder is, provided to the customer through the display module 2080 and the video data decoded by the video decoder is displayed on the display module 2080.

The display module 2080 displays video data and audio data decoded by the A/V decoder 2075 under control of the ITF operation controller 2050. The display module 2080 also receives EPG data from the ITF operation controller 2050 and displays the received EPG data under control of the ITF operation controller 2050.

Figure 21:
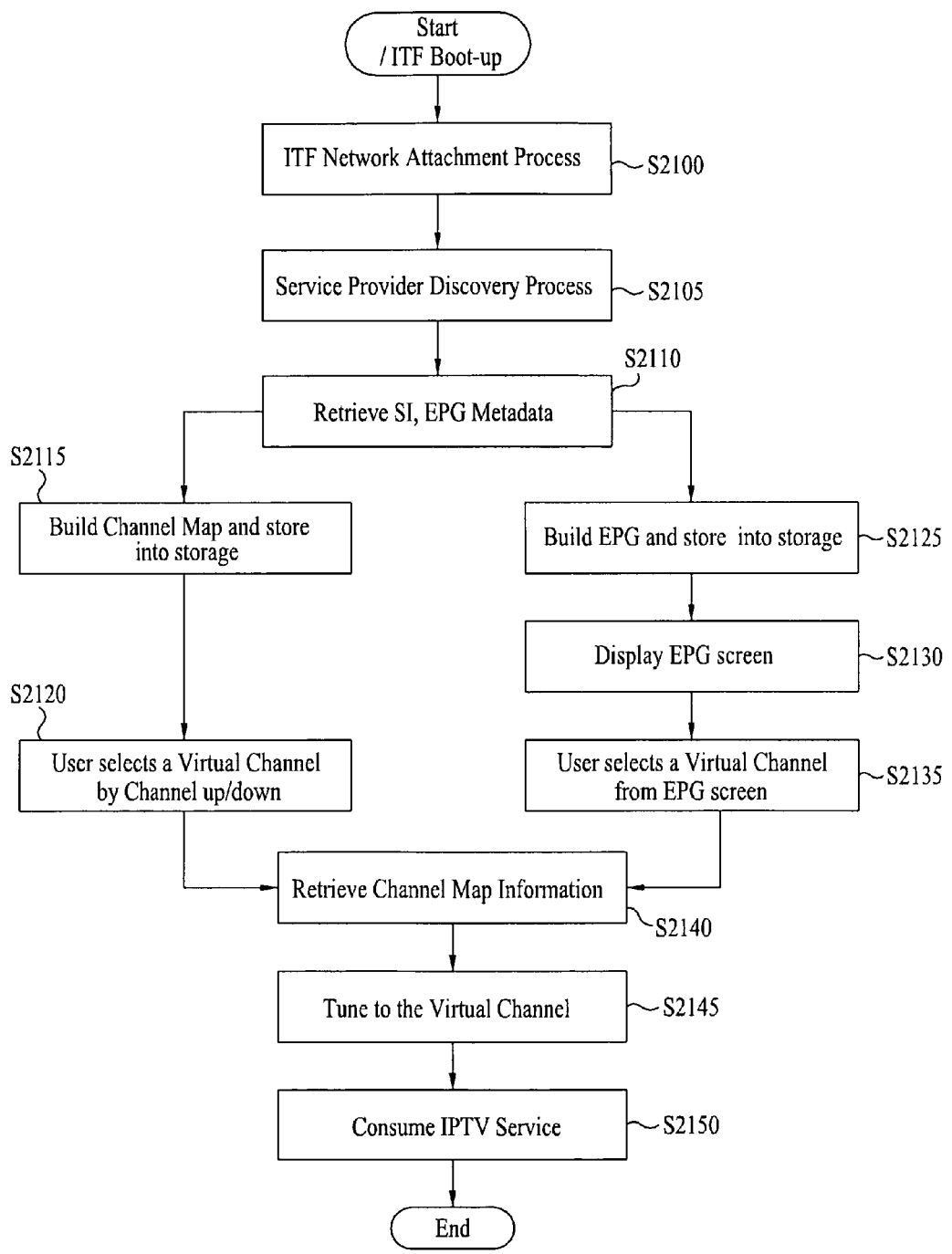
FIG. 21 is a flow chart illustrating a procedure of a preferred embodiment of a virtual channel setting method according to the present invention.

FIG. 21 is a flow chart illustrating a procedure of a preferred embodiment of a virtual channel setting method according to the present invention.

As shown in FIG. 21, the ITF performs network attachment (S2100). Here, the network attachment is a process in which the ITF establishes a connection between the IP network and the layer 3 and obtains network configuration data.

The ITF performs service provider discovery to obtain service provider discovery record (S2105). Here, the ITF can perform the service provider discovery described above with reference to FIG. 13.

The ITF retrieves SI and EPG data using information included in the service provider discovery record (S2110). Here, the ITF can perform service provider registration and service discovery described above with reference to FIG. 14 in order to obtain SI metadata. The ITF can perform service provider registration to retrieve a registration output record and can perform service discovery based on information included in the obtained ITF registration output record. Then, the ITF can perform service discovery to retrieve a master SI table record, a channel map record, and a channel details record. The SI metadata can be read from information included in the channel map record and the channel details record.

The ITF can retrieve EPG data based on information included in the EPGDiscoveryLocation element included in the ITF registration output record.

The ITF generates a channel map using the retrieved SI metadata and stores the generated channel map (S2115). The ITF then receives a virtual channel request signal from the customer (S2120). Here, the customer can select a virtual channel through channel-up and channel-down operations.

The ITF generates an EPG using the retrieved EPG data and stores the generated EPG (S2125). The ITF displays the stored EPG (S2130). The ITF receives a signal requesting a virtual channel selected from the displayed EPG (S2135). Here, the customer can select a specific virtual channel that they desire to view from the EPG displayed on the screen.

The ITF searches the stored channel map for information of a virtual channel requested according to the virtual channel request signal (S2140). Here, the ITF can search for channel details location information including a service ID identical to the service ID of the requested virtual channel in the channel map and detect information of a location from which the virtual channel can be received included in the LocationURL attribute in the channel details location information. The ITF also searches for channel details including a service ID identical to the service ID of the requested virtual channel and detects details of the requested virtual channel.

The ITF tunes to the requested virtual channel based on the found virtual channel information (S2145). Here, the ITF can access an address indicated by information of a location from which the detected virtual channel can be received and receive an IPTV service of the requested virtual channel. The ITF provides the received IPTV server to the customer (S2150).

As is apparent from the above description, the present invention provides an IPTV receiver and a method of providing channel map management information, which have advantages in that it is possible to efficiently search for and obtain an IPTV service and to quickly and correctly update IPTV service information, thereby enabling efficient management of IPTV service information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of providing a virtual channel map in an Internet protocol TV (IPTV) transmitter, the method comprising:

transmitting a provision information including location information of a master system information (SI) table through a network; and transmitting a master SI table pointed by the location information of the master SI table, wherein the master SI table includes location information of a virtual channel map information; and transmitting the virtual channel map pointed by the location information of the virtual channel map, wherein the virtual channel map includes a default location of details information of virtual channels in the virtual channel map, a first service identifier for identifying a virtual channel and an override location of details information of a virtual channel in the virtual channel map, wherein the override location overrides the default location, wherein the details information include a second service identifier, and wherein details information of the virtual channel identified by the first service identifier corresponds to details information whose second service identifier is equal to the first service identifier.

2. The method according to claim 1, wherein the provision information includes, electronic programming guide (EPG) discovery information, and address information of a remote configuration and management (RCM) server.

3. The method according to claim 1, wherein the master SI table further includes identifier information of a service provider, version information of the master SI table and version information of a virtual channel map.

4. The method according to claim 1, wherein the master SI table further includes one or more pointers for pointing one or more virtual channel maps.

5. The method according to claim 1, further comprising:
receiving a request of the master SI table transmitted based on the location information of the master SI table.

6. A method of receiving a virtual channel map in an Internet protocol TV (IPTV) receiver, the method comprising:
connecting a service provider through a network;
receiving a provision information including location information of a master system information (SI) table;
parsing the received provision information to read the location information of the master SI table;
receiving the master SI table based on the read location information of the master SI table;
parsing the received master SI table to read location information of a virtual channel map record;
receiving the virtual channel map based on the location information of the virtual channel map; and
parsing the received virtual channel map to read a default location of details information of virtual channels in the virtual channel map, a first service identifier for identifying a virtual channel and an override location of details information of a virtual channel in the virtual channel map,
wherein the override location overrides the default location,
wherein the details information include a second service identifier, and
wherein details information of the virtual channel identified by the first service identifier corresponds to details information whose second service identifier is equal to the first service identifier.

7. The method according to claim 6, further comprising:
requesting the master SI table based on the location information of the master SI table.

8. The method according to claim 6, wherein the provision information further includes electronic programming guide (EPG) discovery information and address information of a remote configuration and management (RCM) server.

9. The method according to claim 6, wherein the received master SI table further includes identifier information of a service provider, version information of the master SI table and version information of a virtual channel map.

10. The method according to claim 6, wherein the received master SI table further includes one or more pointers for pointing one or more virtual channel maps.

11. An Internet protocol TV (IPTV) receiver comprising:
a network interface transmitting and receiving an Internet protocol (IP) packet through a network;
an IP network stack confirming a destination of the received IP packet and dividing the IP packet according to protocols;
a system information (SI) decoder parsing a provision information included in the IP packet to read location information of a master SI table included in the provision information, parsing the master SI table included in the IP packet to read location information of a virtual channel map included in the master SI table, and parsing the virtual channel map included in the IP packet to read a default location of details information of virtual channels in the virtual channel map, a first service identifier for identifying a virtual channel and an override location of details information of a virtual channel in the virtual channel map; and
an IPTV terminal function (ITF) operation controller controlling the reception of the master SI table based on the read location information of the master SI table, and the reception of the virtual channel map based on the location information of the virtual channel map,
wherein the override location overrides the default location, and
wherein the details information include a second service identifier, and
wherein details information of the virtual channel identified by the first service identifier corresponds to details information whose second service identifier is equal to the first service identifier.

12. The IPTV receiver according to claim 11, wherein the ITF operation controller controls the master SI table to be requested based on the location information of the master SI table.

13. The IPTV receiver according to claim 11, wherein the provision information further includes electronic programming guide (EPG) discovery information and address information of a remote configuration and management (RCM) server.

14. The IPTV receiver according to claim 11, wherein the master SI table further includes identifier information of a service provider, version information of the master SI table, and version information of a channel map.

15. The IPTV receiver according to claim 11, wherein the master SI table includes one or more pointers for pointing one or more virtual channel maps.

* * * * *